United States Patent [19]
Izumi et al.

[11] Patent Number: 6,163,348
[45] Date of Patent: *Dec. 19, 2000

[54] IMAGE DISPLAY APPARATUS

[75] Inventors: Yoshihiro Izumi, Kashihara; Hiroshi Hamada, Nara; Kazuhiko Tsuda, Tenri, all of Japan

[73] Assignee: Sharp Kabushiki Kaisha, Osaka, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/442,562

[22] Filed: May 16, 1995

[30] Foreign Application Priority Data

May 16, 1994 [JP] Japan .................................... 6-101215
Mar. 27, 1995 [JP] Japan .................................... 7-068373

[51] Int. Cl.[7] .............................. H04N 9/31; H04N 5/74; G02F 1/00
[52] U.S. Cl. .......................... 348/761; 348/766; 348/751; 349/25; 359/460
[58] Field of Search ..................... 348/751, 761, 348/766, 760, 791; 359/40, 41, 443, 452, 453, 460; 353/74, 77, 78, 84; 349/24–30; H04N 5/74, 9/31

[56] References Cited

U.S. PATENT DOCUMENTS

| | | | |
|---|---|---|---|
| 3,592,527 | 7/1971 | Conners et al. ........................ | 348/791 |
| 3,666,881 | 5/1972 | Stein ......................................... | 349/25 |
| 3,944,358 | 3/1976 | Bergen ..................................... | 355/9 |
| 4,150,876 | 4/1979 | Yevick ..................................... | 349/25 |
| 4,714,956 | 12/1987 | Yin ........................................... | 348/777 |
| 5,124,545 | 6/1992 | Takanashi et al. ..................... | 250/21 R |
| 5,467,216 | 11/1995 | Shigeta et al. .......................... | 359/263 |
| 5,486,936 | 1/1996 | Fujikake et al. ........................ | 359/51 |

OTHER PUBLICATIONS

"High Definition TV Rear Projector Using LCD Panels", M. Yokozawa, *Display and Imaging*, vol. 1, No. 1, pp. 25–31 (1992).

"A New Video Rate LCLV Projector of SLM Type", K. Wakatsuki, et al., *Display and Imaging*, vol. 1, No. 1, pp 47–52 (Sep. 1992).

"1280 x 1024 Video Rate Laser–Addressed Liquid Crystal . . . ", T. E. Phillips, et al., *Optical Engineering*, vol. 31, No. 11, pp. 2300–2311 (Nov. 1992).

*Primary Examiner*—Michael Lee

[57] ABSTRACT

The image display apparatus of the invention includes: an image projector for projecting a plurality of optical images having image information for a color display in a juxtapositional color mixture state; and a direct-viewing type screen including two opposed faces, wherein the plurality of optical images projected from the image projector onto one of the two opposed faces of the screen vary optical characteristics of the other of the two opposed faces so as to write the image information for a color display; and the written image information for a color display is read out by utilizing surrounding light from the other face, thereby performing a color display.

17 Claims, 15 Drawing Sheets

Dependence of photoconductivity of a—Si:H on wavelength

IMAGE DISPLAY APPARATUS

BACKGROUND OF THE INVENTION

1. Field of the Invention

The present invention relates to a direct-viewing type image display apparatus usable for various kinds of audio-visual (AV) apparatuses and office automation (OA) apparatuses.

2. Description of the Related Art

In order to realize the wide-spread popularization of a high-definition television set (HDTV) in the near future, a display apparatus is currently required to be more and more large-scale and to have a much larger capacity of image information. More specifically, in order to follow up the remarkable development of a high-resolution image, the number of the pixels in a display screen is required to be increased from 240 thousand, i.e., 400×600, up to a million, i.e., 1000×1000, or more and the size of the display screen is also required to be enlarged from a conventional type 20 to a type 40.

A conventional direct-viewing type TV using a Braun tube (or a cathode ray tube (CRT)) is insufficient for realizing such a large-scale display apparatus for home use. This is because a conventional direct-viewing type TV has problems in various aspects, i.e., the weight, the volume and the consuming power thereof. Therefore, it is desirable to develop a display apparatus allowing for solving such problems.

Various display apparatuses, other than a CRT like an emissive display apparatus such as a plasma display panel (PDP); a direct-viewing type liquid crystal display (LCD) apparatus using a back light; and a projection type display apparatus and the like are generally used. In order to fulfill the above-mentioned requirements, research has been actively conducted so as to develop various display apparatuses such as those described above.

Under such circumstances, a projection type display apparatus (or a projector), for realizing a large screen display by enlarging an image displayed in a CRT or an LCD panel so as to project the image on the screen, is now commercially available.

As an exemplary projection type display apparatus, a rear projection type display apparatus (or a rear projector) using a liquid crystal panel is disclosed in a document entitled "Display and Imaging" (Vol. 1, No. 1, p. 25, 1992). The display apparatus disclosed in the document will be described with reference to FIGS. 15 and 16.

FIG. 15 shows an optical system for a rear projection type display apparatus. This display apparatus includes: a light source (or a lamp) 101; a cold mirror 102; a projection optical system 110; and a projection lens 103 as main components thereof. The projection optical system 110 includes: dichroic mirrors 111 for separating and synthesizing spectrums; condenser lenses 112; and liquid crystal panels 113 for displaying three primary colors of red (R), green (G) and blue (B). In addition to these main components, the display apparatus further includes; two projection mirrors 104 and 105; and a transmission type screen 106.

In the display apparatus having the above-described configuration, an image is formed by the projection optical system 110 by using a light beam emitted from the light source 101 so as to be projected by the projection lens 103 via the projection mirrors 104 and 105 onto the screen 106. It is noted that a screen obtained by attaching a Fresnel lens substrate and a lenticular substrate is required to be used as the screen 106 in order to increase the resulting brightness of the image to be displayed.

FIG. 16 shows the disposition of these components inside the display apparatus. The main components, that is, the light source 101, the projection optical system 110, the projection lens 103 and the like are disposed in a lateral (or horizontal) direction on the upper bottom surface of the display apparatus. The light beam passed through the projection optical system 110 is emitted from the projection lens 103 in a lateral direction; refracted by a first projection mirror 104 at 90 degrees; and then directed to the rear side of the apparatus. The light beam being directed to the rear side is reflected by a second projection mirror 105, thereby projecting the image on the screen 106. By using this configuration, it is possible to make the apparatus thinner in size and lighter in weight.

On the other hand, an exemplary front projection type display apparatus (or a front projector) is disclosed in the documents entitled "Display and Imaging" (Vol. 1, No. 1, p. 47, 1992), and "Optical Engineering" (Vol. 31, No. 11, p. 2300, 1992) and the like.

The rear projection type display apparatus using a CRT or a liquid crystal panel has the following problems.

(1) It is necessary to employ a high-brightness projection CRT or a high-brightness projection liquid crystal panel (or a high-brightness projection lamp), so that the consuming power becomes disadvantageously high, e.g., 150 W or higher.

(2) Because of the adverse effects of the focusing characteristics of a Fresnel lens substrate and a lenticular substrate to be used for the screen, the resolution of the resulting image is reduced and the viewing angle at the time of display is restricted.

(3) A method in which an appropriate diffuser is provided on the screen may be used in order to enlarge the viewing angle for display. However, in such a case, the reduction of the display contrast and brightness (or the gains on the screen) can not be prevented.

In particular, in order to solve the problem (1) among those described above, it is desirable to develop a display apparatus consuming even lower power in view of the recent tendencies towards the protection of the global environment. For example, according to an energy saving promotion policy "Energy Star Program" issued by United States Environmental Protection Office, a power consumption of 30 W or lower is demanded. The problems (2) and (3) relate to the display quality of the image, and therefore these problem must be solved in order to represent an image of high quality with much presence on the screen of an HDTV.

In conventional display apparatuses, not only a rear projection type display apparatus but also an emissive display apparatuses such as a CRT and a PDP, and a front projection type display apparatus, if the display apparatus is placed within a bright environment or an environment where illuminated light is externally incident on the display screen of the apparatus, the ratio of the brightness of the displayed light to the surrounding light, i.e., a contrast, is reduced. Thus the brightness of the display apparatus is required to be increased in order to prevent the reduction of the contrast, so that the power consumption can not help being increased.

SUMMARY OF THE INVENTION

The image display apparatus of the invention includes: an image projector for projecting a plurality of optical images having image information for a color display in a juxtapositional color mixture state; and a direct-viewing type screen including two opposed faces. In the image display apparatus, a plurality of optical images projected from the image projector onto one of the two opposed faces of the screen vary optical characteristics of the other of the two opposed faces so as to write the image information for a color display; and the written image information for a color display is read out by utilizing surrounding light from the other face, thereby performing a color display.

In one embodiment, the image projector includes a liquid crystal panel or a Braun tube allowing for a color display.

In another embodiment, the plurality of optical images respectively correspond to primary color components required for a color display, and the screen includes color filters corresponding to the primary color components required for a color display.

The image display apparatus according to another aspect of the invention includes: an image projector for projecting a plurality of optical images having image information for a color display in a superposed color mixture state; and a direct-viewing type screen including two opposed faces and a filter layer for dividing a plurality of optical images projected from the image projection means onto one of the two opposed faces in the multiple color mixture state into respective optical images. In the image display apparatus, the plurality of divided optical images vary optical characteristics of the other of the two opposed faces so as to write the image information for a color display; and the written image information for a color display is read out by utilizing surrounding light from the other face, thereby performing a color display.

In one embodiment, the image projector includes a plurality of liquid crystal panels or a plurality of Braun tubes having respectively different display colors.

In another embodiment, the plurality of optical images respectively correspond to primary color components required for a color display, and the screen further includes color filters corresponding to the primary color components required for a color display.

The image display apparatus according to still another aspect of the invention includes: an image projector including a laser for generating a laser beam so as to project an optical image having image information by sequentially scanning the laser beam generated by the laser beam generation means; and a direct-viewing type screen including two opposed faces. In the image display apparatus, the optical image projected from the image projection means onto one of the two opposed faces vary optical characteristics of the other of the two opposed faces so as to write the image information; and the written image information is read out by utilizing surrounding light from the other face, thereby performing a display.

In one embodiment, the laser beam generation means is a semiconductor laser.

In another embodiment, the screen further includes color filters corresponding to primary color components required for a color display.

In still another embodiment, the plurality of optical images respectively correspond to primary color components required for a color display, and the screen has a multi-layered structure including at least two layers, each of the at least two layers being a device for displaying a different color and varying a brightness of the color.

In still another embodiment, the screen includes: a pair of substrates facing each other; a voltage application unit for applying a voltage to a portion between the pair of substrates; a photoconductive film provided between the pair of substrates, where an impedance is varied in accordance with an intensity of incident light; a liquid crystal layer provided on a side of the other face of the screen with respect to the photoconductive film provided between the pair of substrates; and a reflection layer provided on a side of one face of the screen with respect to the liquid crystal layer provided between the pair of substrates.

In still another embodiment, the screen includes: a pair of substrates facing each other; a voltage application unit for applying a voltage to a portion between the pair of substrates; a light absorption film provided between the pair of substrates, where a temperature is varied in accordance with an intensity of incident light; a liquid crystal layer provided on a side of the other face of the screen with respect to the light absorption film provided between the pair of substrates; and a reflection layer provided on a side of one face of the screen with respect to the liquid crystal layer provided between the pair of substrates.

In still another embodiment, the screen has a structure for reading the written image information by utilizing a reflection or a scattering of surrounding light.

In still another embodiment, the screen includes: a pair of substrates facing each other; a divider for dividing a portion between the pair of substrates into a plurality of layers; a voltage application unit for applying a voltage to each of the plurality of layers; a photoconductive film, where an impedance is varied in accordance with an intensity of incident light; and a device, provided on a side of the other face of the plurality of layers with respect to the photoconductive film, for displaying respectively different colors and varying a brightness thereof.

In still another embodiment, the screen includes: a pair of substrates facing each other; a divider for dividing a portion between the pair of substrates into a plurality of layers; a voltage application unit for applying a voltage to each of the plurality of layers; a plurality of photoconductive films exhibiting sensitivities to light having respectively different particular wavelengths, where an impedance is varied in accordance with an intensity of incident light; and a device, provided on a side of the other face of the plurality of layers with respect to the photoconductive films, for displaying respectively different colors and varying a brightness thereof.

In still another embodiment, the screen includes: a pair of substrates facing each other; a divider for dividing a portion between the pair of substrates into a plurality of layers; a voltage application unit for applying a voltage to each of the plurality of layers; a plurality of photoconductive films, provided for every pixel of the plurality of layers, having a size sufficiently smaller than that of one pixel, where an impedance is varied in accordance with an intensity of incident light; and a device, provided on a side of the other face of the plurality of layers with respect to the photoconductive films, for displaying respectively different colors and varying a brightness thereof.

In still another embodiment, the device for displaying respectively different colors and varying a brightness thereof is a guest host type liquid crystal device.

In still another embodiment, the device for displaying respectively different colors and varying a brightness thereof includes a multi-layered structure containing a liquid crystal and a polymer for varying a reflectance of a particular color by using a multiple interference effect.

In still another embodiment, the device for displaying respectively different colors and varying a brightness thereof is a device for varying a particular reflectance by using a wavelength selective reflection effect of a cholesteric liquid crystal.

An image display apparatus of the invention includes a screen having a function of varying the optical characteristics of the display medium in accordance with an optical image projected from an image projector, that is to say, the function of controlling the molecular orientation in the display medium with the heat and light of the optical image. Hereinafter, such a function will be referred to as an "active function" and the screen having the function will be referred to as an "active screen". Accordingly, it is no longer necessary to use a high-brightness rear projection type CRT or liquid crystal panel. Even if a low-brightness CRT or liquid crystal panel is used, a satisfactory image may be projected onto the screen at a lower power consumption. In addition, such an image may be formed on the screen by point-sequentially scanning the beam emitted from a semiconductor laser, in place of using the projection type CRT or liquid crystal panel. In such a case, the power consumption may be made even lower, e.g., 30 W or lower.

Moreover, in an image display apparatus of the invention, a reflection type active screen for displaying an image by utilizing the reflection of the surrounding light (fluorescent light or natural light) is used, unlike the image display using the light transmitted through the screen. Consequently, it becomes possible to eliminate the degradation of the image quality caused by a lenticular substrate or a diffuser, as is often the case with a conventional rear projection type display apparatus.

Furthermore, in an image processing apparatus of the invention, the screen has a multi-layered structure including at least two layers for controlling the brightness of the light having a particular wavelength, so that a full-color display may be performed only by one pixel and the area of one pixel is not required to be divided. Consequently, a display with a very high brightness is realized.

Thus, the invention described herein makes possible the advantage of providing an image display apparatus for displaying an image of high quality while consuming lower power.

These and other advantages of the present invention will become apparent to those skilled in the art upon reading and understanding the following detailed description with reference to the accompanying figures.

DESCRIPTION OF THE PREFERRED EMBODIMENTS

Hereinafter, the present invention will be described by way of illustrative examples with reference to the accompanying drawings.

EXAMPLE 1

Figure 1:
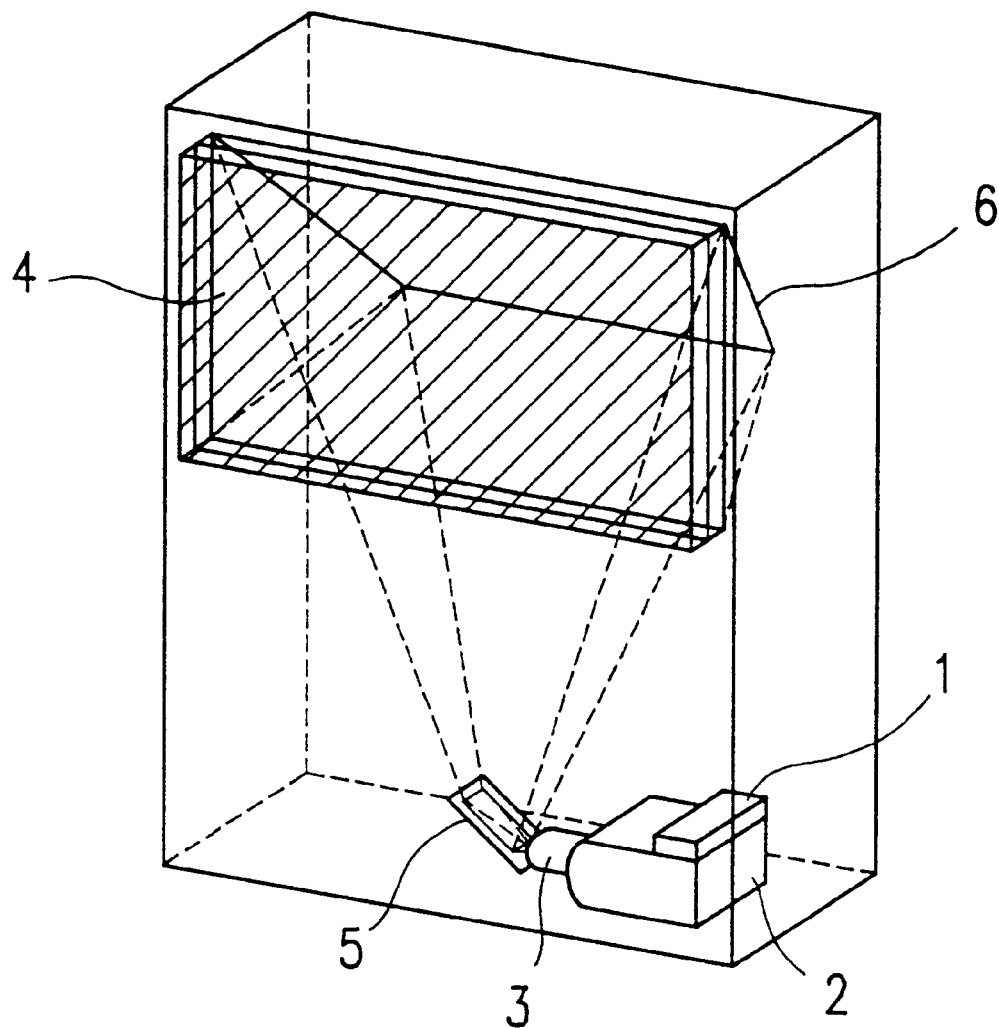
FIG. 1 is a perspective view showing an entire configuration of an image display apparatus according to a first example of the invention.

FIG. 1 is a perspective view showing an entire configuration for a rear projection type image display apparatus according to a first example of the invention. Referring to FIG. 1, the configuration of the display apparatus of this example will be described in detail below.

Figure 16:
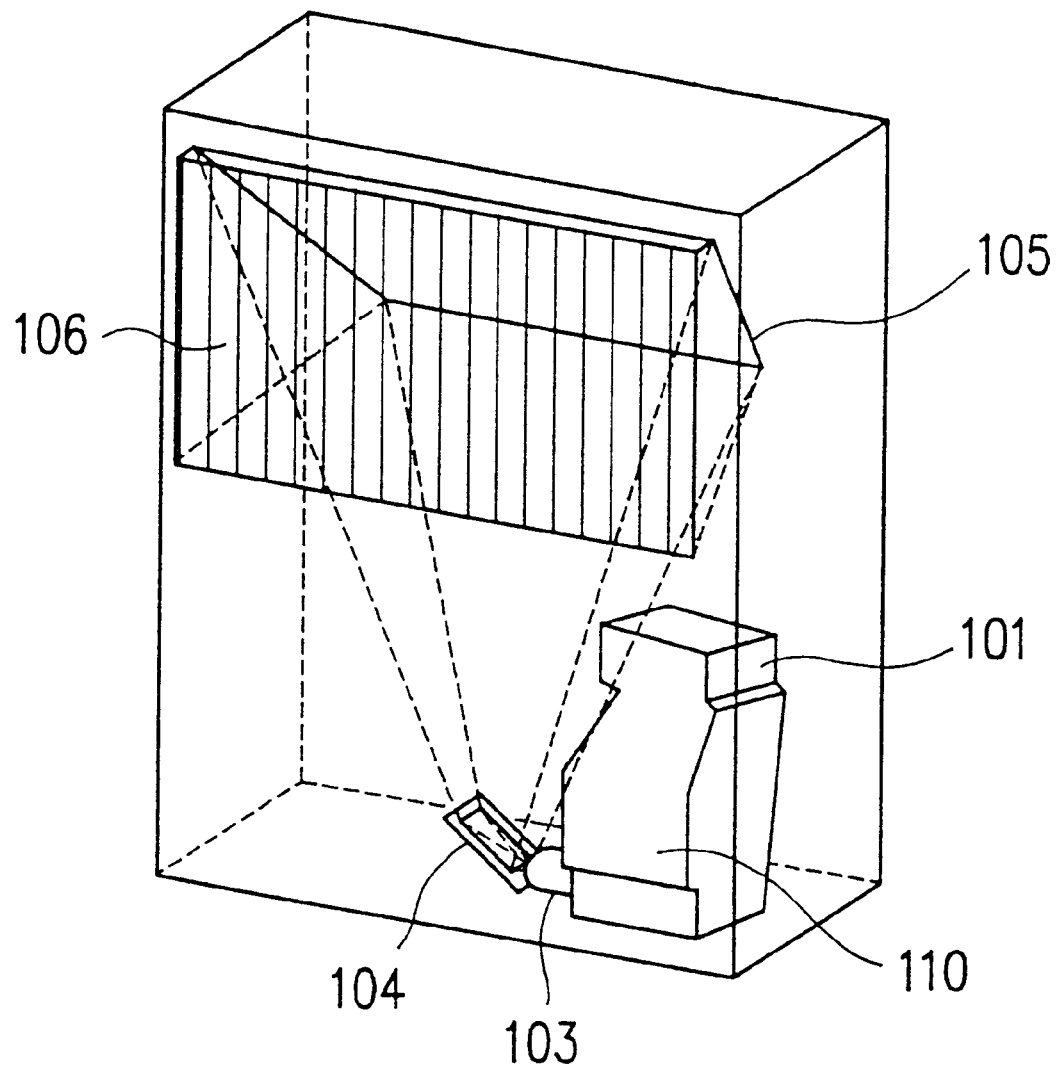
FIG. 16 is a perspective view showing an internal disposition for the conventional rear projection type image display apparatus using a liquid crystal panel.

As shown in FIG. 1, the display apparatus of this example includes the same main components as those of the conventional rear projection type display apparatus shown in FIG. 16, that is, a light source 1 for emitting a light beam for forming an image; a projection optical system 2 serving as an image information projection means; a projection lens 3; and a screen 4 serving as an image display screen. In this example, a low-brightness lamp is used as the light source 1. An optical system having the same configuration as that of a conventional projection type CRT or liquid crystal panel may be used as the projection optical system 2. This display apparatus further includes projection mirrors 5 and 6 for projecting the image emitted from the projection lens 3 onto the screen 4.

Figure 2:
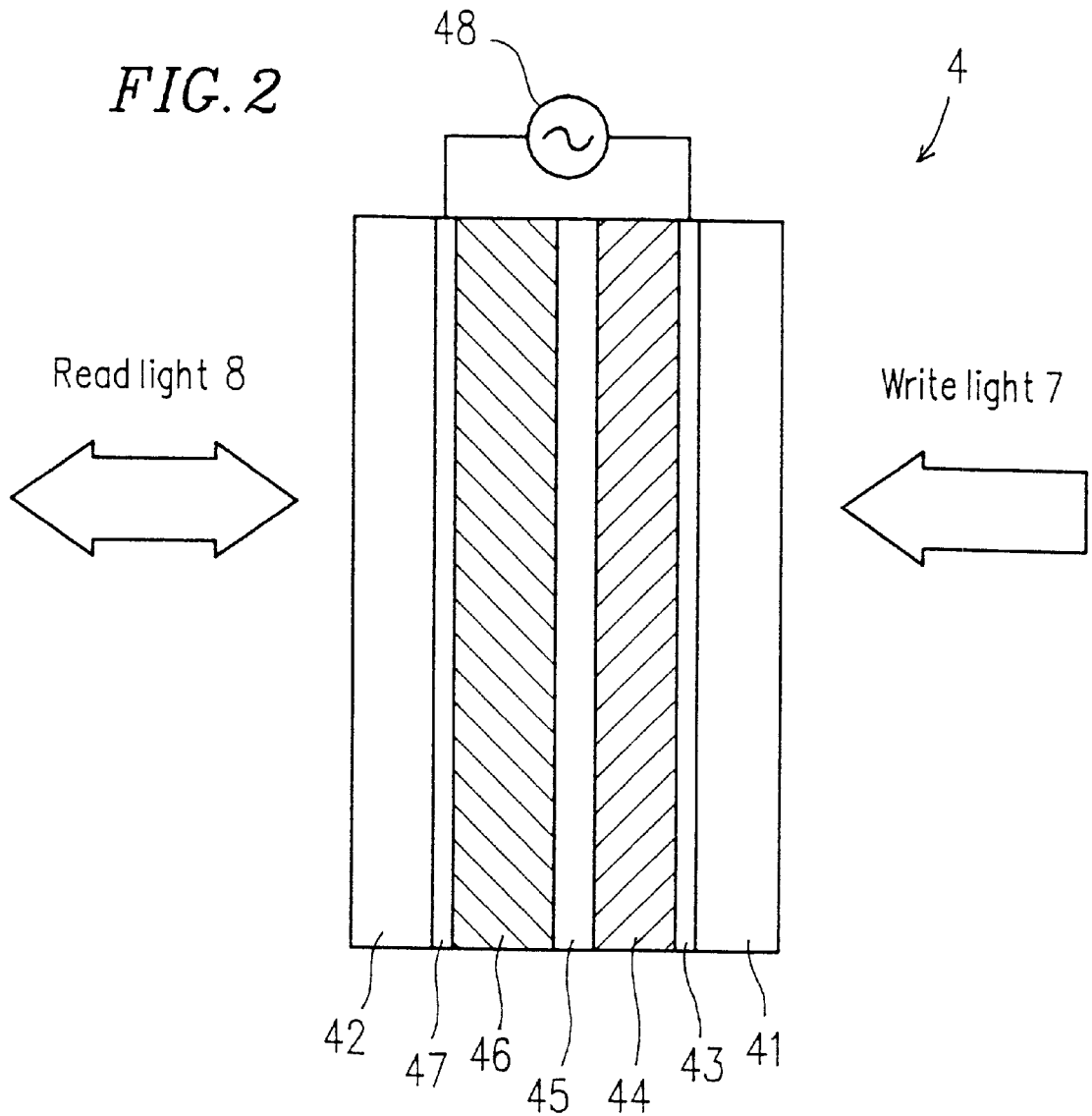
FIG. 2 is a cross-sectional view showing a fundamental structure for a screen of the image display apparatus according to the first example of the invention.

FIG. 2 shows a cross section of the screen 4, one of the main components of the display apparatus of this example.

Referring to FIG. 2, the fundamental structure of the screen 4 will be described below.

This screen 4 includes: a transparent conductive film 43; a photoconductive film 44; a reflection layer 45; a liquid crystal layer 46; and a transparent conductive film 47 between a pair of transparent substrates 41 and 42 (these films and layers are stacked in this order on the surface of the transparent substrate 41). An AC power supply 48 is connected to the transparent conductive films 43 and 47, thereby applying an AC voltage to the portion between both transparent conductive films 43 and 47.

An image display operation on the screen 4 having such a structure will be described. This screen 4 has a spatial light modulation function. That is to say, a light signal is converted into an electric signal in the photoconductive film 44, and the electric signal is converted again into a light signal in the liquid crystal layer 46. Accordingly, this screen 4 operates like a reflection type light valve. In this example, the screen 4 of such a system will be called an optical write type active screen.

This operation will be described in more detail. A write light 7 is incident on the screen 4 from the substrate 41 side. The write light 7 includes image information as patterns of the light intensities. When the image information is supplied to the photoconductive film 44 as the write light 7, the impedance of the photoconductive film 44 is varied depending on the intensities of the light. In accordance with the variation of the impedance of the photoconductive film 44, the voltage to be applied to the liquid crystal layer, 46 is varied. In the liquid crystal layer 46, the orientation state of the liquid crystal molecules is varied in accordance with the applied voltage. In other words, the degree of the modulation to be applied to the light passing through the liquid crystal layer 46 is varied in accordance with the applied voltage. On the other hand, a read light 8 for reading out the image information from the screen 4 is incident on the screen 4 from the substrate 42 side. The incident read light 8 is transmitted through the liquid crystal layer 46; reflected by the reflection layer 45; transmitted through the liquid crystal layer 46 again; and then output from the substrate 42 side. During this process, the image information to be read by the read light 8 is subjected to an optical modulation in the liquid crystal layer 46 so as to correspond to the write light 7.

Next, the materials for the respective layers constituting this screen 4 and the methods for producing these layers will be described.

The transparent conductive films 43 and 47 may be made of tin oxide ($SnO_2$), indium tin oxide (ITO), zinc oxide (ZnO) or the like. In this example, an ITO film formed by a sputtering technique is used as the transparent conductive films 43 and 47. The photoconductive film 44 may be made of an inorganic or organic material whose conductivity is efficiently varied upon the absorption of the light, e.g., group IV semiconductors such as silicon (Si), carbon (C), or germanium (Ge); and selenium (Se), cadmium sulfide (CdS), polyvinyl carbazole (PVK), and the like may be used. In the case where the size of the screen 4 is approximately 40 inch type, an amorphous material and organic photoconductor (OPC) are preferably used owing to the restrictions during the production process. In this example, hydrogenated amorphous silicon (a-Si: H) formed by a plasma CVD method is used for the photoconductive film 44. The reflection layer 45 is required to efficiently reflect the light in a visible region, and to exhibit an electrical insulation characteristic with respect to the plane direction. Accordingly, a dielectric mirror utilizing the interference caused by stacking dielectric layers, or a mirror including a plurality of island-shaped metallic film portions obtained by patterning a metallic film is required to be used for the reflection layer 45. In this example, a mirror obtained by patterning an aluminum (Al) film, formed by a sputtering technique, in a plurality of island-shaped portions having a diagonal of about 100 μm is used. The patterning may be conducted by using a photoresist printing method. Liquid crystal materials for various kinds of display modes may be used for the liquid crystal layer 46. In this example, a guest host liquid crystal using a dichroic dye is used for the liquid crystal layer 46.

Depending on a case, in order to spatially isolate the write light 7 and the read light 8 from each other completely, a light shielding film made of cadmium telluride (CdTe) or hydrogenated amorphous SiGe (a-SiGe: H) may be provided between the photoconductive film 44 and the reflection layer 45.

Next, display principles of the image display apparatus using the screen 4 having such an active function will be described below.

Figure 3:
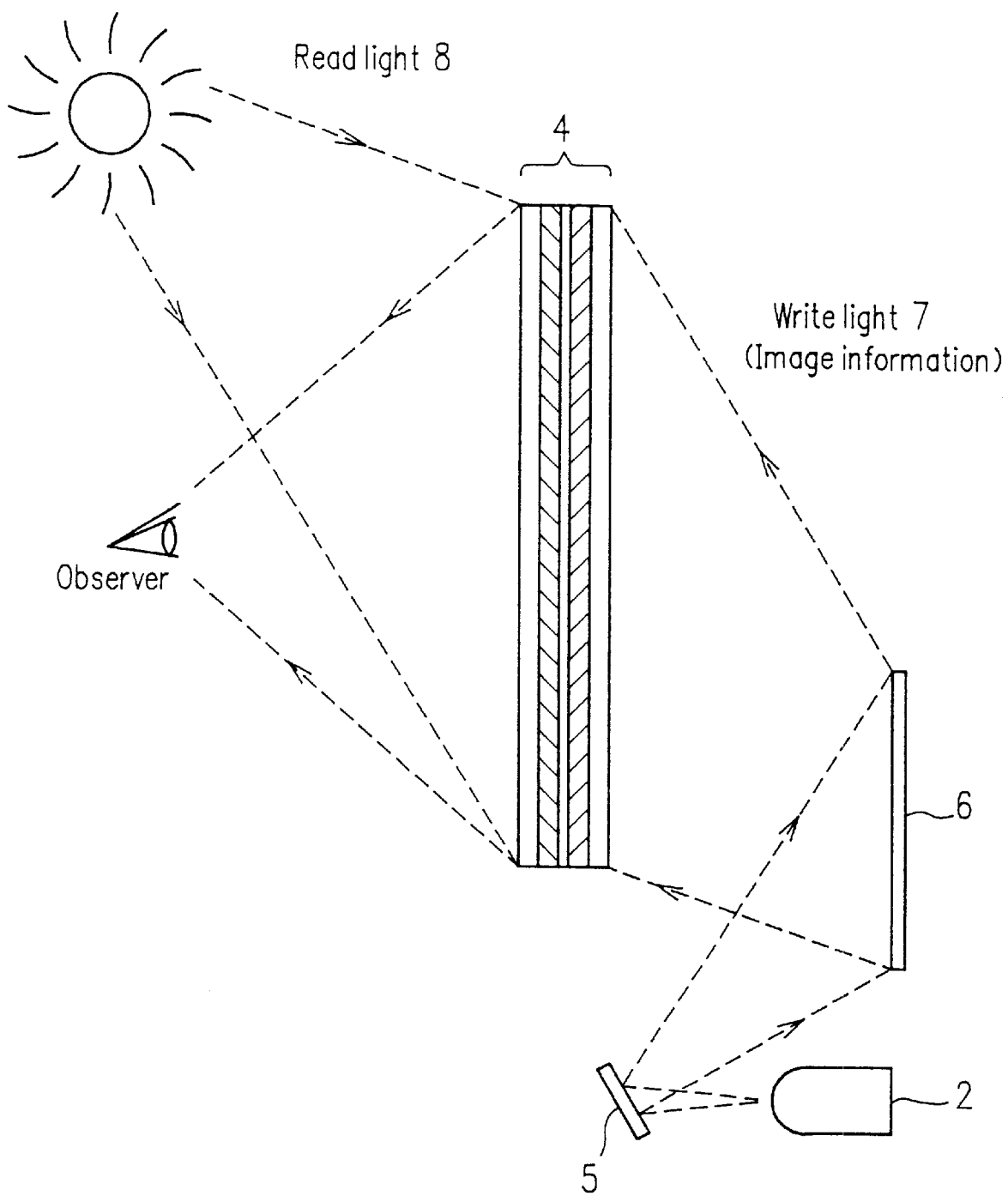
FIG. 3 is a schematic diagram illustrating the principle of the display performed by the image display apparatus according to the first example of the invention.

FIG. 3 schematically shows the display principles of such a display apparatus. The image information projected from the projection optical system 2 is used as the write light 7 shown in FIG. 2. The image information projected from the projection optical system 2 is reflected by the projection mirrors 5 and 6 and then projected onto the write side of the screen 4 (the right side of the screen 4 in FIG. 3) in an enlarged shape. The screen 4, receiving the image information, performs the active operation as mentioned above, so that the molecular orientation state in the liquid crystal layer 46 is varied depending on the light intensity of the image information. By employing a reflective direct-viewing mode as the display mode for the liquid crystal layer 46, it is possible to use the surrounding light such as room light and natural light as the read light 8, so that an image corresponding to the write light 7 may be displayed.

In this example, the write light 7 is not required to be of a high brightness unlike a conventional display apparatus. The reason is as follows. The voltage $V_L$ to be applied to the liquid crystal layer 46 of the screen 4 may be approximated by the following equation (1).

$$V_L = V \times Z_L / (Z_L + Z_P) \tag{1}$$

where V is a voltage to be applied from the AC power supply 48, $Z_P$ is an impedance of the photoconductive film 44, and $Z_L$ is an impedance of the liquid crystal layer 46. If the threshold voltage when the molecular orientation in the liquid crystal layer 46 is varied is denoted by $V_{Lth}$; the voltage to be applied to the liquid crystal layer 46 when the light is irradiated on the photoconductive film 44 is denoted by $V_{Lon}$; and the voltage to be applied to the liquid crystal layer 46 when the light is not irradiated on the photoconductive film 44 is denoted by $V_{Loff}$, then the screen 4 may operate actively so long as the expression $V_{Lon}<V_{Lth}<V_{Loff}$ or the expression $V_{Lon}>V_{Lth}>V_{Loff}$ is satisfied. Therefore, it becomes possible to use a low-brightness projection type CRT or liquid crystal panel (or a low-brightness projection type lamp).

As a result, an image may be displayed on the screen 4 at a power consumption as low as 30 W, or at most 100 W, although the value depends on the display mode used for the liquid crystal layer 46 and the thickness of the liquid crystal layer 46. Therefore, it is possible to reduce the power consumption as compared with a conventional rear projection type display apparatus. In addition, if the brightness of the projection type CRT or that of a projection type lamp is set to be low, then the lifetime thereof may be extended, and at the same time, the reliability thereof may be improved.

As described above, an image display apparatus of the invention is characterized by the fact that the display is performed by using the reflected light of the surrounding light. The surrounding light refers to room light and natural light such as a fluorescent light. Specifically, it is sufficient for the surrounding light to have a brightness of about 200 luxes. Therefore, according to the invention, it is no longer necessary to use a high-brightness projection type CRT or liquid crystal panel (or a high-brightness projection type lamp) unlike a conventional rear projection type display apparatus. This is because the projection optical system 2 used in the image display apparatus of the invention is provided only for actively operating the screen 4.

In addition, since the image displayed on the screen 4 is a liquid crystal display in a reflective direct-viewing mode, it is possible to eliminate the degradation of the image quality caused by a lenticular substrate and a diffuser substrate constituting the screen, which has been undesirably generated in a conventional rear projection type display apparatus. Furthermore, even under a bright environment, an observer may obtain a natural image.

EXAMPLE 2

In the foregoing first example of the invention, an image display apparatus using a projection type CRT or liquid crystal panel as the projection optical system 2 is shown. In this second example, an image display apparatus using a laser as the projection optical system 2 will be described.

Figure 4:
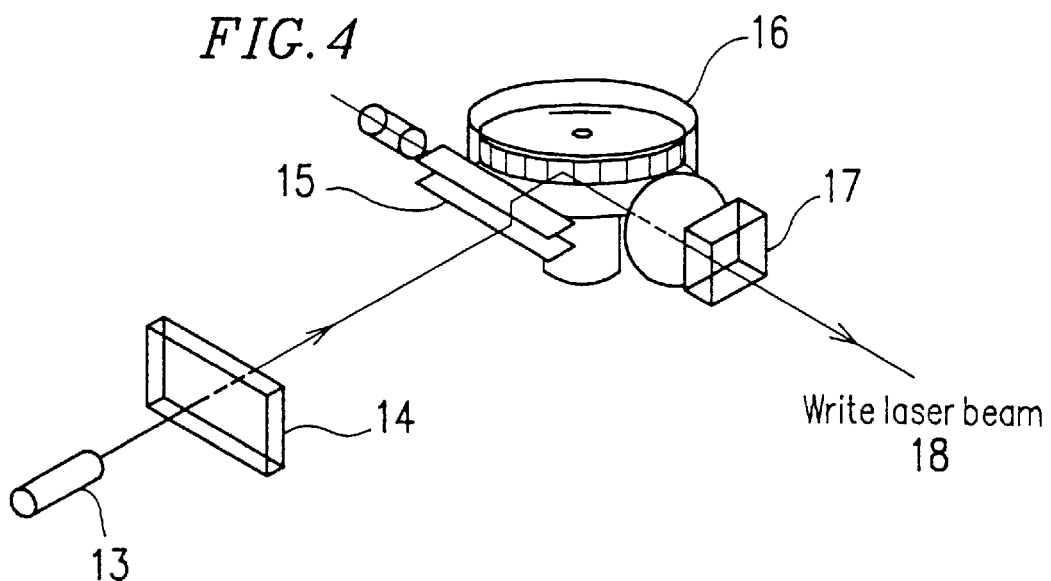
FIG. 4 is a perspective view showing the configuration of a point-sequentially scanning optical system using the laser for an image display apparatus according to a second example of the invention.

FIG. 4 shows the configuration of a point-sequentially scanning optical system using the laser. As shown in FIG. 4, this optical system includes: a laser 13; a modulator 14; a vertically scanning mirror 15; a horizontally scanning mirror 16; and a projection lens 17. In view of downsizing the entire system, a semiconductor laser (oscillation wavelength: 680 nm) is used as the laser 13. An acousto-optic (AO) device is used as the modulator 14, thereby modulating the incident laser beam as the variation of the light intensity corresponding to the image information. A galvano mirror is used as the vertically scanning mirror 15 and a polygon mirror is used as the horizontally scanning mirror 16. In the case where the optical scanning is required to be performed at a high velocity, another AO device may be provided in place of the respective scanning mirrors 15 and 16, thereby optically scanning by the use of the deflection modulation function of the AO device.

The operation of the point-sequentially scanning optical system having the above-described configuration will be described below. The light beam emitted from the laser 13 is incident on the modulator 14, and then modulated by the modulator 14 in accordance with the image information. The modulated light beam is sequentially scanned at the points corresponding to the respective pixels in the image information by the vertically scanning mirror 15 and the horizontally scanning mirror 16. As a result, the modulated light beam is projected via the projection lens 17 onto the screen 20, shown in FIG. 5 as the write laser beam 18.

Figure 5:
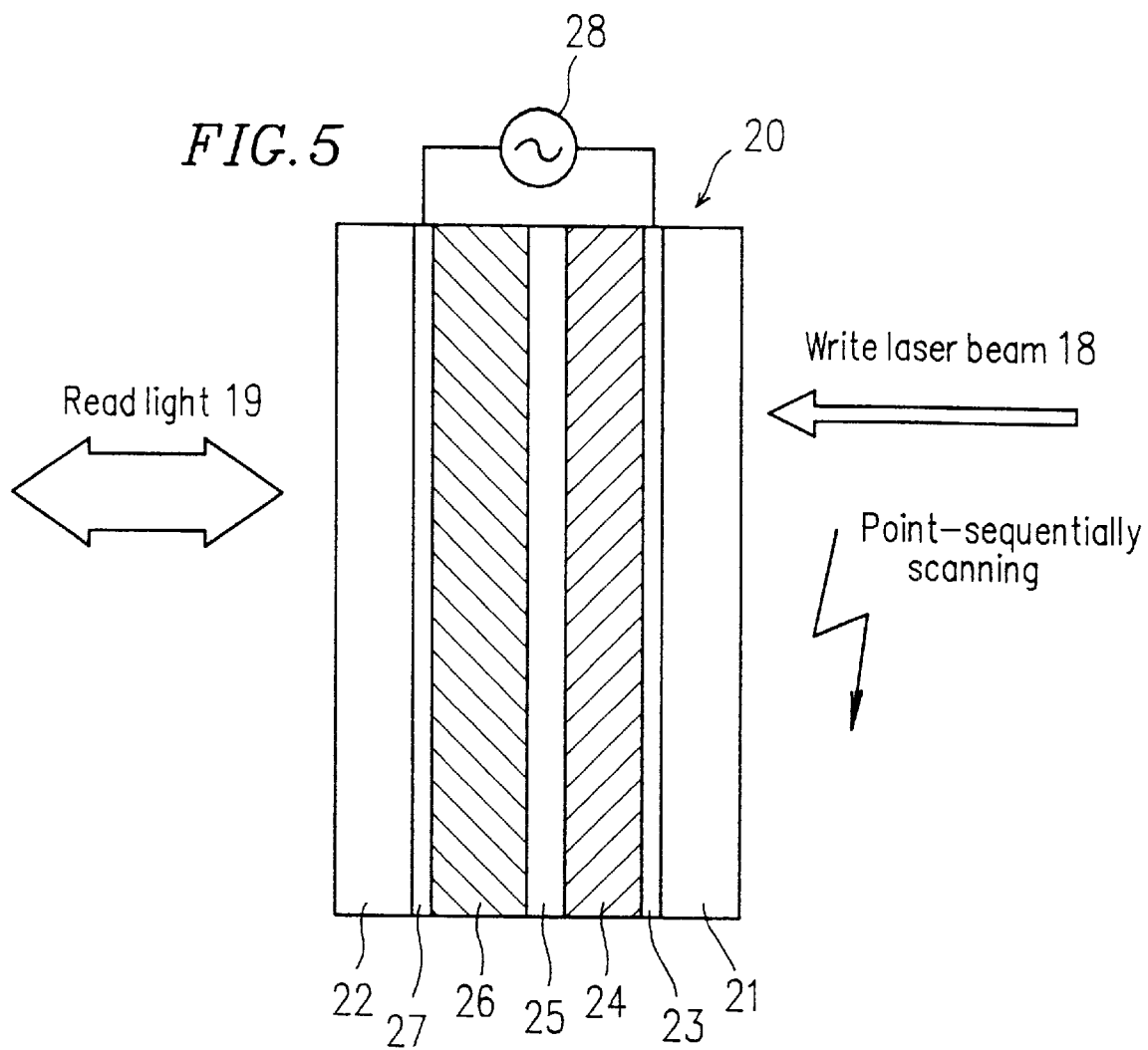
FIG. 5 is a cross-sectional view showing a fundamental structure for a screen of the image display apparatus according to the second example of the invention.

FIG. 5 shows the cross section of the screen 20 to be used in this example. Referring to FIG. 5, the fundamental structure of the screen 20 will be described.

This screen 20 includes: a transparent conductive film 23; a light absorption film 24; a reflection layer 25; a liquid crystal layer 26; and a transparent conductive film 27 between a pair of transparent substrates 21 and 22 (these films and layers are stacked in this order on the surface of the transparent substrate 21). An AC power supply 28 is connected to the transparent conductive films 23 and 27, thereby applying an AC voltage to the portion between the transparent conductive films 23 and 27.

The image display operation in the screen 20 having the above-mentioned structure will be described. This screen 20 has a spatial light modulation function. That is to say, a light signal is converted into heat by the light absorption film 24, and the heat is converted again into a light signal in the liquid crystal layer 26. Accordingly, this screen operates like a reflection type light valve. In this example, the screen 20 of this system will be called a thermal write type active screen.

This operation will be described in more detail. A write laser beam 18 is incident on the screen 20 from the substrate 21 side. The write laser beam 18 includes image information as patterns of the light intensities. When the image information is supplied to the light absorption film 24 as the write laser beam 18, the temperature of the light absorption film 24 is varied depending on the intensities of the light. In accordance with the variation of the temperature of the light absorption film 24, the temperature of the liquid crystal layer 26 is varied. In the liquid crystal layer 26, the phase transition is generated in accordance with the variation of the temperature. In other words, the degree of the modulation applied to the light passing through the liquid crystal layer 26 is varied. On the other hand, a read light 19 for reading out the image from the screen 20 is incident on the screen 20 from the substrate 22 side. The incident read light 19 is transmitted through the liquid crystal layer 26; reflected by the reflection layer 25; transmitted through the liquid crystal layer 26 again; and then output from the substrate 22 side. During this process, the image information to be read by the read light 19 is subjected to an optical modulation in the liquid crystal layer 26 so as to correspond to the write laser beam 18.

Next, the materials used for the respective layers constituting this screen 20 and the methods for producing these layers will be described.

The transparent conductive films 23 and 27 may be made of tin oxide ($SnO_2$), indium tin oxide (ITO), zinc oxide (ZnO) or the like. It is necessary to use a material in which the temperature is varied efficiently upon the absorption of the light, i.e., a material having a large absorption coefficient of $10^4$ cm$^{-1}$ or more, for the light absorption film 24. The light absorption film 24 may be made of hydrogenated amorphous Si (a-Si: H), cadmium telluride (CdTe) or the like. In this example, CdTe having a large absorption coefficient of about $10^5$ cm$^{-1}$ in the wavelength (680 nm) region of the write laser beam 18, is used. The reflection layer 25 is required to efficiently reflect the light in a visible region, and to efficiently transmit the heat of the light absorption film 24 to the liquid crystal layer 26 without diffusing the heat to the plane direction, so that a very thin aluminum (Al) film having a thickness of about 0.5 µm is used. A liquid crystal material for a phase transition type display mode where the phase transition is generated by the heat supplied by the write laser beam 18 is used for the liquid crystal layer 26. The phase of this liquid crystal is changed from a smectic phase (S phase) through a nematic phase (N phase) into a liquid crystal (I phase) depending on the temperature. During the process when the liquid crystal is cooled down so as to be changed into an S phase after the temperature of the liquid crystal has risen, a scattering nucleus is formed. Consequently, the heat of the write laser beam 18 enables the display.

Alternatively, the display may be performed by generating a scattering in the liquid crystal layer 26 by heating the layer with the current from the AC power supply 28, and then by irradiating the write laser beam 18 while applying a voltage thereto.

The image display apparatus of this second example may be constructed by replacing the point-sequentially scanning optical system using the laser shown in FIG. 4 and the screen 20 shown in FIG. 5 with the projection optical system 2 and the screen 4 of the image display apparatus of the first example as shown in FIG. 1, respectively.

The write laser beam 18 projected from the point-sequentially scanning optical system using the laser in accordance with the image information is reflected by the projection mirrors so as to be irradiated on the write side of the screen 20, i.e., the right side of the screen 20 shown in FIG. 5. The screen 20, receiving the write laser beam 18, performs the above-mentioned active operation, so that the phase transition is generated because of the change in the molecular orientation state in the liquid crystal layer 26 depending on the light intensity of the image information. Since the display mode of the liquid crystal layer 26 is a reflective type direct-viewing mode utilizing the phase transition, the surrounding light such as room light and natural light functions as the read light 19, so that the image corresponding to the write laser beam 18 may be displayed.

As described above, the image display apparatus of the invention is characterized by the fact that the display apparatus displays an image by utilizing the reflected light of the surrounding light. Accordingly, it is no longer necessary to use a high-brightness projection type CRT or liquid crystal panel (or a high-brightness projection type lamp) unlike a conventional rear projection type display apparatus. The number of the semiconductor laser (oscillation wavelength: 680 nm) to be used for the point-sequentially scanning optical system is basically one. In some cases, one display screen is constituted by using a plurality of semiconductor lasers. However, in such cases, it is also possible to suppress the power consumption at 30 W or lower.

As a result, an image may be displayed on the screen 20 at a low power consumption of about 30 W, although the value depends on the display mode to be used for the liquid crystal layer 26 and the thickness of the liquid crystal layer 26. Consequently, the display apparatus may be driven at a lower power consumption as compared with a conventional rear projection type display apparatus.

In addition, since the image displayed on the screen 20 is displayed in a reflective type direct-viewing liquid crystal display mode, it is possible to eliminate the degradation of the image quality caused by a lenticular substrate and a diffuser substrate constituting the screen, which has been undesirably generated in a conventional rear projection type display apparatus. Furthermore, an observer may obtain a natural image even under a bright environment.

Also, it is possible to form an image by combining the above-mentioned point-sequentially scanning optical system using the laser and the optical write type active screen 4 of the first example. Since the thermal write type active screen 20 using the phase transition type liquid crystal has a relatively slow response velocity, the optical write type active screen 4 of the first example is more suitable for displaying a TV image for an HDTV, etc. In the case of using the point-sequentially scanning optical system using the laser, it is preferable to use a material having a memory function (e.g., a ferroelectric liquid crystal) for the liquid crystal layer.

EXAMPLE 3

In the foregoing first and second examples, an image display apparatus of the invention where a reflective type direct-viewing image display may be obtained by combining a projection optical system and a screen having an active function is described with respect to the fundamental configuration thereof. However, the screen 4 of the first example and the screen 20 of the second example do not include components for a color display. Therefore, these screens may perform nothing but a monochrome display unless such components are provided.

In this third example, a screen allowing for a color display by using fundamentally the same components as those of the image display apparatus of the first example will be described with respect to the configuration and the display principles thereof.

Figure 6:
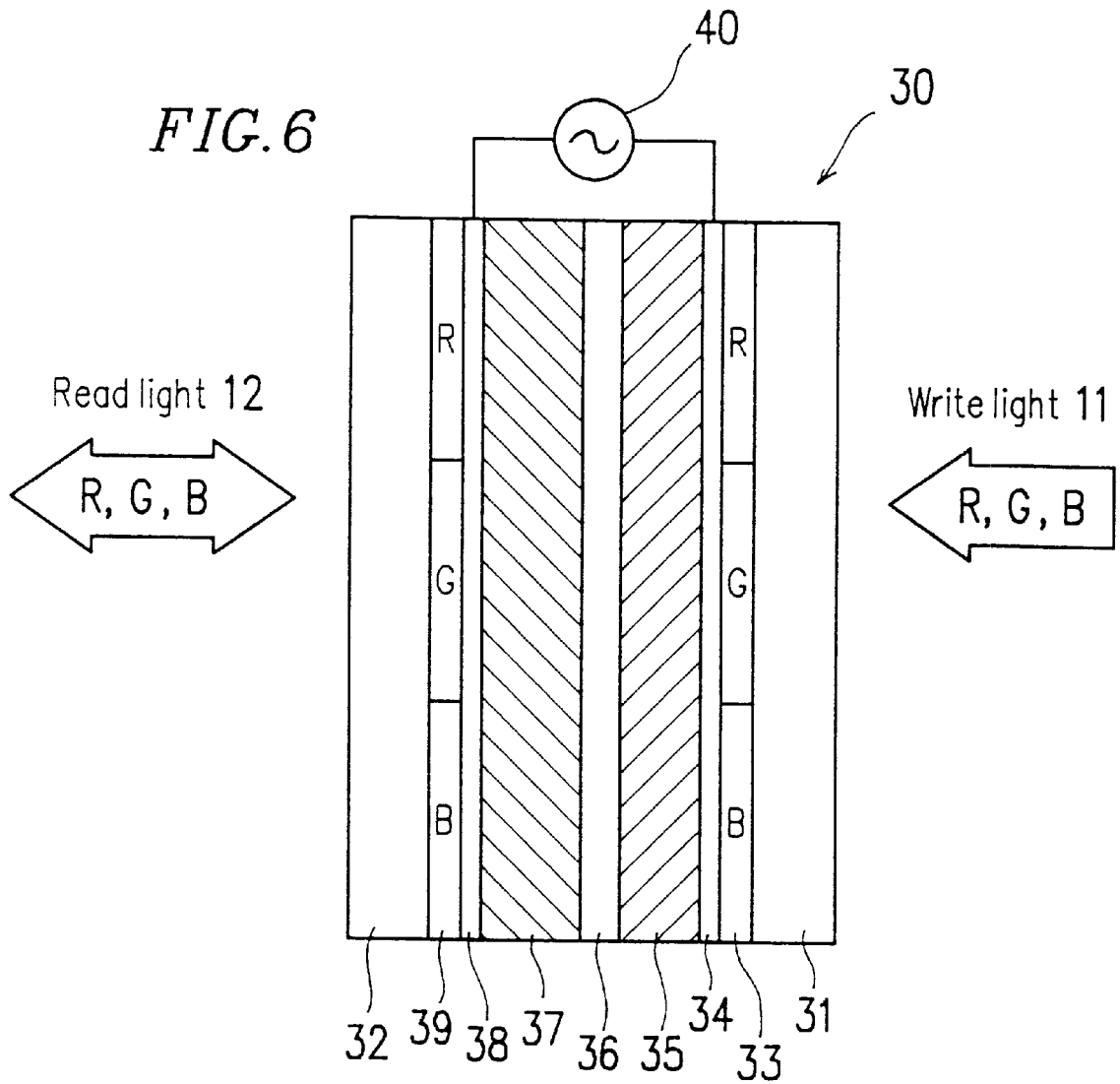
FIG. 6 is a cross-sectional view showing a fundamental structure for a screen of a color image display apparatus according to a third example of the invention.

FIG. 6 shows the cross section of a screen 30 allowing for a color display. Referring to FIG. 6, the fundamental structure of the screen 30 will be described below.

This screen 30 includes: a color filter layer 33; a transparent conductive film 34; a photoconductive film 35; a reflection layer 36; a liquid crystal layer 37; a transparent conductive film 38 and a color filter layer 39 between a pair of transparent substrates 31 and 32 (these films and layers are stacked in this order on the surface of the transparent substrate 31). The color filter layers 33 and 39 are constituted by stripe-shaped or mosaic-shaped filters corresponding to the three primary colors of red (R), green (G) and blue (B). In the color filter layers 33 and 39, the filters corresponding to the three primary colors of R, G and B are arranged at respective positions so as to correspond to each other in the transmission direction of the light. An AC power supply 40 is connected to the transparent conductive films 34 and 38, thereby applying an AC voltage to the portion between the transparent conductive films 34 and 38. This embodiment of the invention is characterized by the fact that the screen 30 includes the color filter layers 33 and 39.

The fundamental operational principles of the image display performed by the screen 30 having such a structure are the same as those of the screen 4 of the first example. In this example, if the write light 11 projected from a CRT or a liquid crystal panel of the projection optical system 2 is the image in which three images having the three primary colors of R, G and B are superposed, the write light 11 is first color-separated by the color filter layer 33, so that the light 11 reaches the positions respectively corresponding to the three primary colors in the photoconductive film 35. Therefore, the liquid crystal layer 37 responds respectively to the three primary colors of R, G and B of the write light 11.

Figure 7:
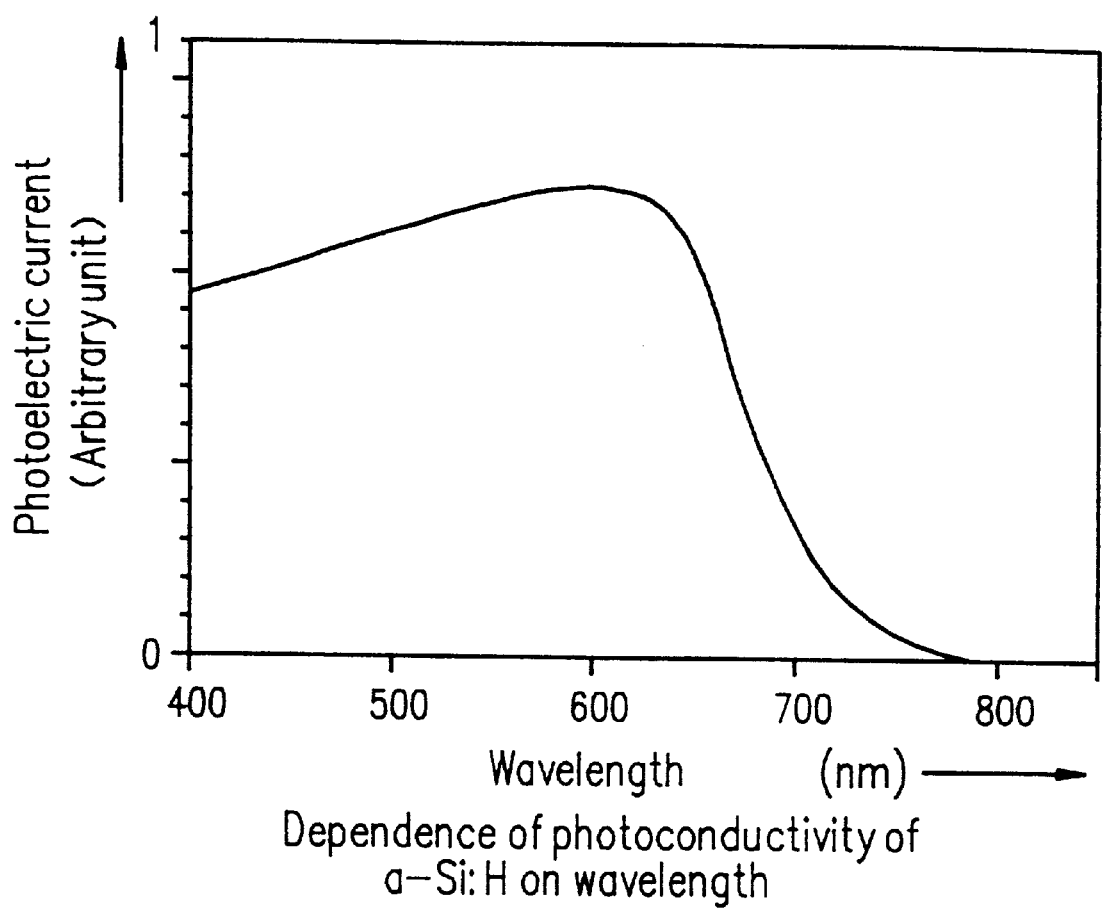
FIG. 7 is a graph showing the dependence of the photoconductivity of hydrogenated amorphous silicon (a-Si: H) on the wavelength of incident light.

In order to realize the above-described operation, the photoconductive film 35 is required to exhibit photoconductivity with respect to the three primary colors of R, G and B. FIG. 7 shows the dependence of hydrogenated amorphous Si (a-Si: H) to be used for the photoconductive film 35 of this example on the wavelength of the incident light. As can be confirmed from FIG. 7, hydrogenated amorphous Si has a broad photoconductivity over the entire visible light region and exhibits photoconductivity with respect to the three primary colors of R, G and B.

Also, the liquid crystal layer 37 of the screen 30 of this example is also required to respond respectively to the three primary colors of R, G and B of the write light 11. Accordingly, by employing a reflective type direct-viewing mode where the surrounding light functions as the read light 12 as the display mode of the liquid crystal layer 37 and by providing the color filter layer 39 on the read side of the screen 30, i.e., the left side of the screen 30 in FIG. 6, a color image may be displayed. The display may be performed by any of the following methods: black shutter methods such as a method in which a white reflection layer, a guest host liquid crystal and color filter layers are used in combination (see, for example, SID 92 Digest, p. 437, 1992) and a method in which a reflection layer, a guest host liquid crystal, scattering type liquid crystal and color filter layers are used in combination (see, for example, Japan Display '92, p. 707, 1992); and a white shutter method in which a reflection layer with color filters and a scattering type liquid crystal are used in combination.

It is noted that the structure shown in FIG. 6 schematically shows one pixel portion of the screen 30. In actuality, a plurality of RGB units in the color filter layers 33 and 39 are arranged in parallel so as to correspond to the number of the pixels in the image information.

Next, a method for further improving the photoconductivity of the photoconductive film 35 over the entire wavelength region of the visible light will be described below.

The photoconductive film 35 mentioned above is made of hydrogenated amorphous Si (a-Si: H). Although a-Si: H exhibits a photoconductivity over the entire region of visible light, the optical bandgap is approximately 1.8 eV. Therefore, in fact, a-Si: H has an inferior sensitivity with respect to blue light as compared with the sensitivity with respect to red light.

Accordingly, by using a photoconductive film having a little larger optical bandgap than that of a-Si: H in combination with a-Si: H, excellent photoconductivity may be obtained over the entire region of the visible light.

More specifically, it is preferable to stack hydrogenated amorphous SiC having an optical bandgap of about 3.0 eV over a-Si: H. In this case, if the a-SiC: H is stacked over the photoconductive film 35 on the write side and the a-Si: H is stacked over the film 35 on the read side, then the light in a short wavelength region of the write light is first absorbed by the a-SiC: H, and then the light in a long wavelength region is absorbed by the a-Si: H. Consequently, excellent photoconductivity may be obtained over the entire visible light region.

On the other hand, in some cases, the write light 11 projected from a CRT or a liquid crystal panel of the projection optical system 2 is not formed by synthesizing the three primary colors of R, G and B and the image information of R, G and B is projected so as to be separated from each other in parallel inside the plane. For example, in the case of using a projection optical system 2 for performing a color display with a single liquid crystal panel, the R, G and B signals reach the screen 30, being separated from each other in parallel so as to correspond to the arrangement of the color filters in the liquid crystal panel. In such a case, the structure of the screen 30 may be further simplified.

Figure 8:
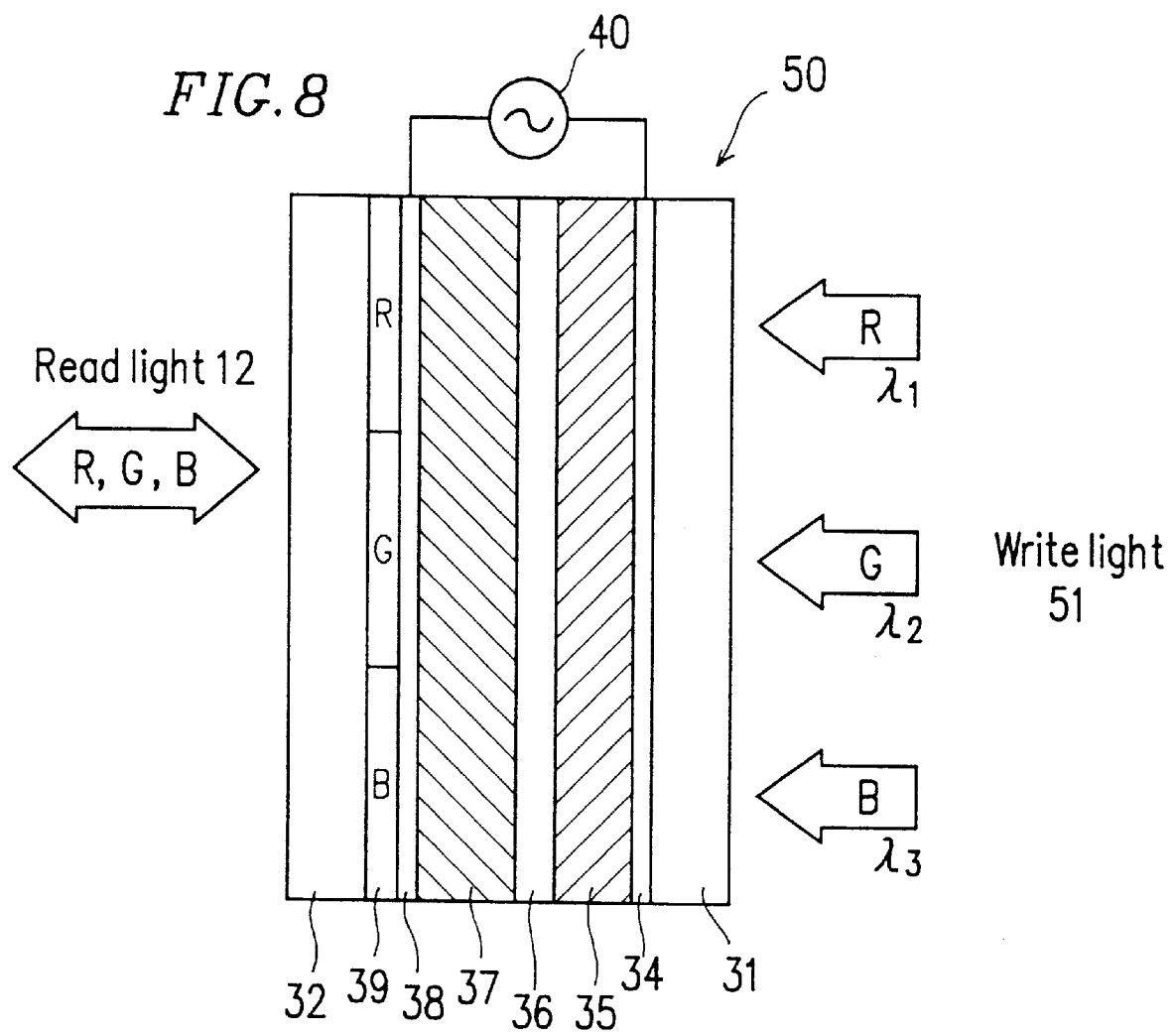
FIG. 8 is a cross-sectional view showing a fundamental structure for a screen of the color image display apparatus according to the third example of the invention, where the image information of the R, G and B colors is separated in parallel inside the screen.

FIG. 8 shows the cross section of a screen 50 to be used in the case where the image information of R, G and B is separated from each other in parallel inside the plane. The same components as those of the screen 30 shown in FIG. 6 are denoted by the same reference numerals, and the description thereof will be omitted herein. The screen 50 of this example includes all the components of the screen 30 except for the color filter layer 33 on the write light side.

By using such a structure, the liquid crystal layer 37 may correspond respectively to the three primary colors of R, G and B of the write light 51, so that the screen 40 may display a color image.

In the above-mentioned screens 30 and 50 allowing for a color display, the wavelength of the write lights 11 and 51 are not necessarily composed of the three primary colors of R, G and B, but it is only necessary to transmit the image information to the respective positions of the photoconductive film 35 corresponding to the three primary colors of the read light 12. Therefore, by employing filters exclusively used for $\lambda 1$, $\lambda 2$ and $\lambda 3$ with respect to the write light 11 obtained by synthesizing three kinds of lights ($\lambda 1$, $\lambda 2$ and $\lambda 3$) having respectively different wavelengths, or by removing the color filter layer on the write light side with respect to the write light 51 where three kinds of lights ($\lambda 1$, $\lambda 2$ and $\lambda 3$) having respectively different wavelengths are separated from each other in parallel, a screen may utilize a write light having all kinds of wavelengths. For example, it is possible to compose the three kinds of lights ($\lambda 1$, $\lambda 2$ and $\lambda 3$) of the infrared lights having respectively different wavelengths. In such a case, needless to say, it is required to select a photoconductive film having an excellent sensitivity with respect to the wavelengths $\lambda 1$, $\lambda 2$ and $\lambda 3$ to be used.

In the case of using the screen 30 having the structure as shown in FIG. 6, the projection optical system 2 is required to include three CRTs or three liquid crystal panels so as to correspond to the three primary colors of R, G and B. Since the three primary colors of R, G and B are multiple synthesized within the same space so as to be projected, optical image information having a very high resolution may be advantageously transmitted to the screen 30. On the other hand, in the case of using the screen 50 having the structure as shown in FIG. 8, it is sufficient for the projection optical system 2 to include only one CRT or one liquid crystal panel which can display a color image, so that an inexpensive projection optical system 2 of a small size is advantageously realized. These two kinds of systems had better be selected so as to be suitable for the respective purposes in view of the respective advantages thereof.

EXAMPLE 4

In this fourth example, a screen for a color display including fundamental components of the image display apparatus of the second example will be described with respect to the structure and the display principles thereof.

Figure 9:
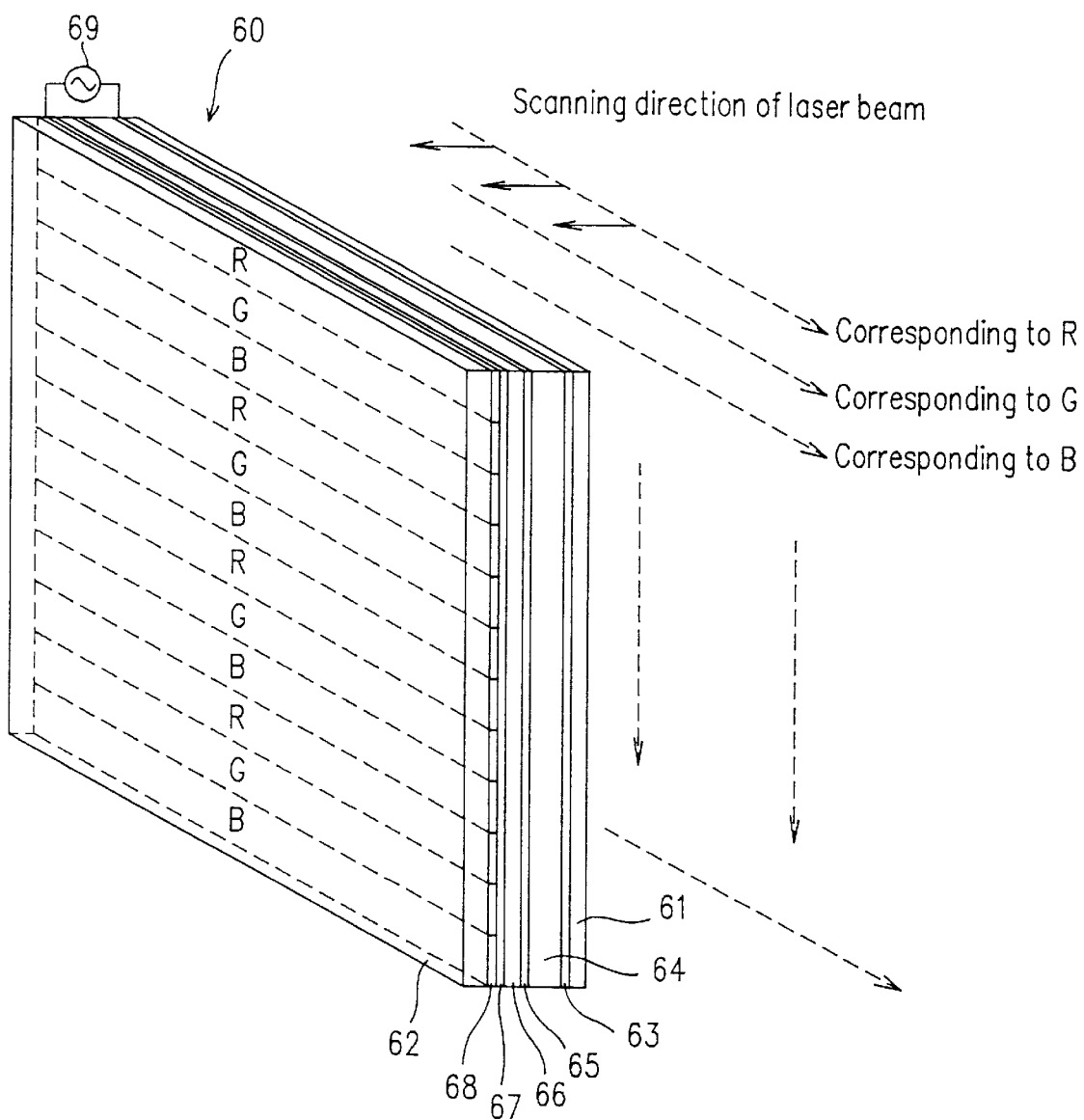
FIG. 9 is a perspective view showing a fundamental structure for a screen of an image display apparatus according to a fourth example of the invention, where the scanning direction of the laser beam is parallel to the arrangement direction of the color filters.

FIG. 9 is a perspective view showing a screen 60 allowing for a color display. Referring to FIG. 9, the fundamental structure of the screen 60 will be described below.

This screen 60 includes: a transparent conductive film 63; a photoconductive film 64; a reflection layer 65; a liquid crystal layer 66; a transparent conductive film 67 and a stripe-shaped color filter layer 68 between a pair of transparent substrates 61 and 62 (these films and layers are stacked in this order on the surface of the transparent substrate 61). An AC power supply 69 is connected to the transparent conductive films 63 and 67, thereby applying an AC voltage to the portion between the transparent conductive films 63 and 67. This embodiment of the invention is characterized by the fact that the screen 60 includes the color filter layer 68 as compared with the second example.

A similar optical system to the point-sequentially scanning optical system using the laser as shown in FIG. 4 is used as the projection optical system.

The fundamental display principles of the screen 60 having such a structure are the same as those of the screen 20 of the second example.

The color filter layer 68 includes a plurality of filters having the three primary colors of R, G and B to be arranged in a stripe shape in order to perform a color display. In FIG.

9, the color filter layer 68 is provided between the pair of substrates 61 and 62. Alternatively, the color filter 68 may be provided on the outer surface of the transparent substrate 62.

The scanning direction of the laser beam emitted from the point-sequentially scanning optical system using the laser is set so as to point-sequentially scan the respective image signals in a direction parallel to the arrangement direction of the filters in the color filter layer 68 as shown in FIG. 9. More specifically, the laser beam sequentially scans the respective image signals line by line, that is to say, the image signal corresponding to R of the color filter layer 68 on the first line; the image signal corresponding to G on the second line; and the image signal corresponding to B on the third line are sequentially scanned. By sequentially repeating this scanning, a full color display may be performed.

When one frame period of the displayed image is denoted by T and the number of the all the lines in the color filter layer 68 is denoted by n, the period required for scanning one line of the color filter layer 68 may be expressed by T/n. Accordingly, the laser beam emitted from the point-sequentially scanning optical system using the laser scans the respective image signals corresponding to R, G and B by switching the signals to be scanned every time the period T/n has passed. On the other hand, in the case where a number m of pixels exist in one line of the color filter layer 68, the period required for scanning one pixel becomes (T/n)/m. It is necessary to input the image information to the respective pixels during this period.

Alternatively, by using three lasers for the point-sequentially scanning optical system using the laser, the three lasers may oscillate the image signals exclusively corresponding to the color filters having the three primary colors of R, G and B in the color filter layer 68. In such a case, the period required for scanning one line of the color filter layer 68 becomes 3T/n, and in addition, the period required for scanning one pixel becomes (3T/n)/m. As a result, the modulation frequency of the laser may be lowered, and therefore the image information may be input to the respective pixels more easily.

Moreover, the scanning direction of the laser beam emitted from the point-sequentially scanning optical system using the laser may be set to be vertical to the arrangement direction of the color filters in the color filter layer 68 so as to point scan the respective image signals.

Figure 10:
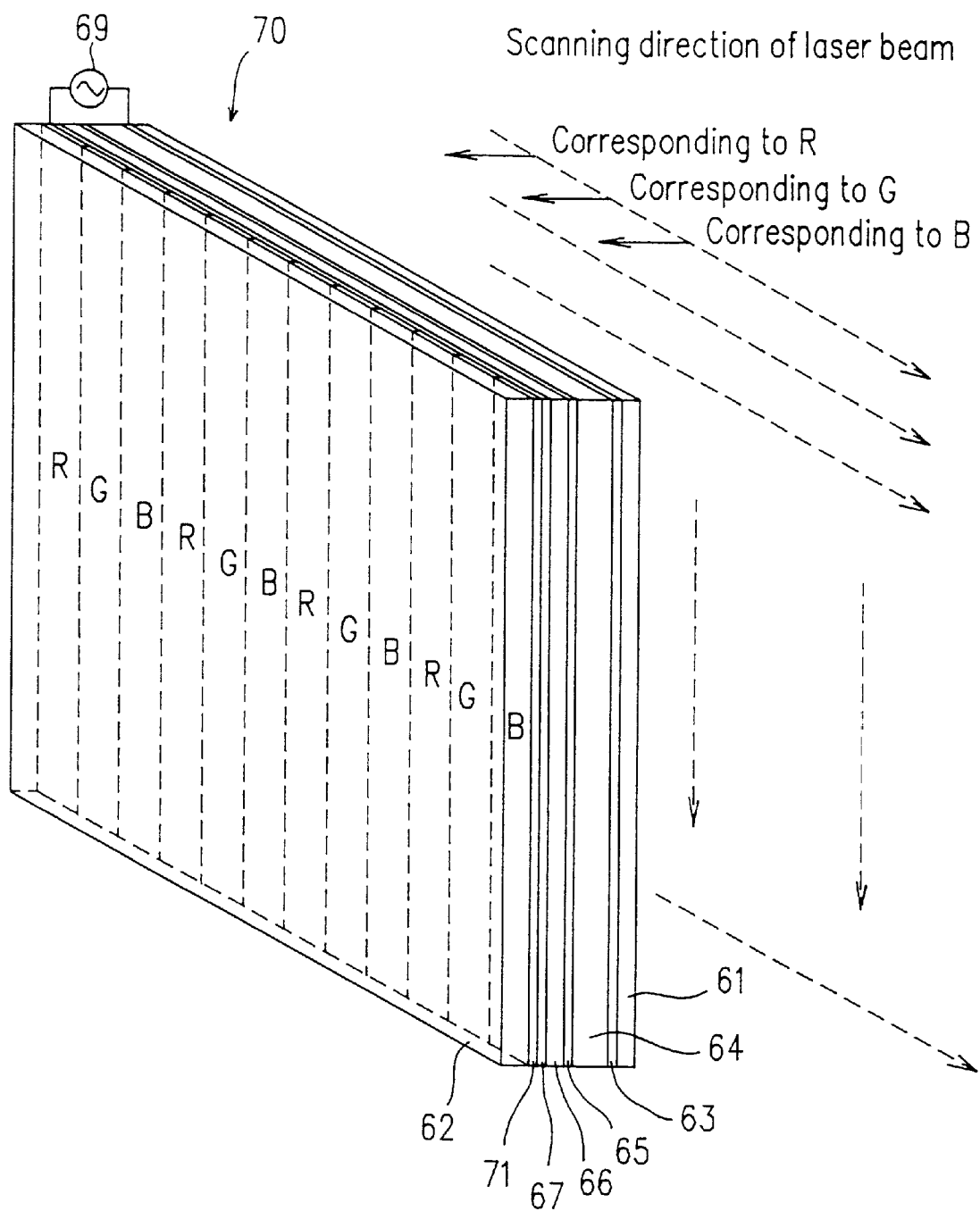
FIG. 10 is a perspective view showing a fundamental structure for a screen of an image display apparatus according to the fourth example of the invention, where the scanning direction of the laser beam is vertical to the arrangement direction of the color filters.

FIG. 10 is a perspective view showing a screen 70 in which the scanning direction of the laser beam crosses the arrangement direction of the color filters at a right angle. The same components as those of the screen 60 shown in FIG. 9 are denoted by the same reference numerals, and the description thereof will be omitted herein. The screen 70 of this example includes a stripe-shaped color filter layer 71 in which a plurality of color filters are arranged in a direction vertical to the point-sequentially scanning direction, in place of the color filter layer 68 of the screen 60 mentioned above.

In this case, when one frame period of the displayed image is denoted by T, the number of all the lines in the color filter layer 71 is denoted by n, and the number of the lines to be scanned by the laser is denoted by m (that is to say, in the case where a number m of pixels exist in one line of the color filter layer 71), the period required for scanning one pixel may be expressed by (T/n)/m. It is necessary to input the image information to the respective pixels during this period. In addition, in modulating the laser beam, the respective image signals of R, G and B are required to be switched every time one pixel has been scanned.

In this example, the operational principles of the image display apparatus allowing for performing a full color display by using a stripe-shaped color filter layer has been described with respect to the screens 60 and 70. Alternatively, a color filter layer having color filters in an island pattern or a mosaic pattern may also be used.

In addition, the screens 60 and 70 may operate in a similar manner to that of the optical write type active screen as described in the first example, or that of the thermal write type screen as described in the second example.

EXAMPLE 5

In the foregoing third example, the fundamental structure of an active screen for performing a color display by dividing the area of the color filter layer into a plurality of filters respectively corresponding to the three primary colors of R, G and B in reading the information has been described. According to this method, however, the utility efficiency of the read light is adversely reduced to a third or less because of the loss caused by the color filters.

In this fifth example, a high-brightness screen having a multi-layered structure allowing for a multiple color display on a pixel basis will be described with respect to the structure and the operational principles thereof. The fundamental components for the screen of this example are the same as those of the image display apparatus of the third example.

Figure 11:
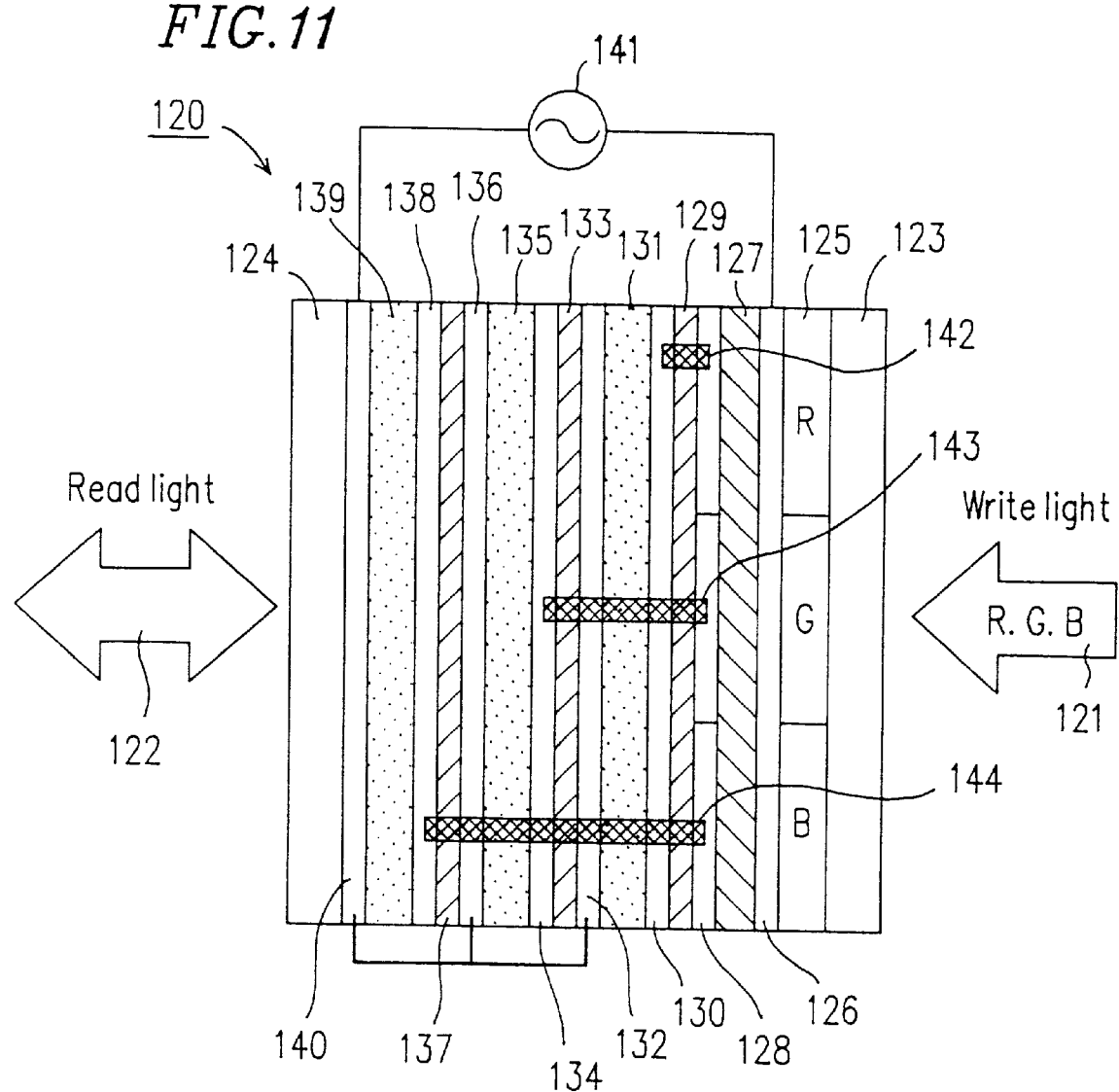
FIG. 11 is a cross-sectional view showing a fundamental structure for a screen of an image display apparatus according to a fifth example of the invention.

FIG. 11 is a cross-sectional view of a display device having a multi-layered structure. Referring to FIG. 11, the fundamental structure of the screen 120 will be described below.

This screen 120 includes a pair of transparent substrates 123 and 124 disposed so as to face each other. The portion between the transparent substrates 123 and 124 is divided into four layers by three insulating layers 129, 133 and 137.

A color filter 125, a conductive film 126, a photoconductive film 127, and a reflector/conductive film 128 are interposed between the transparent substrate 123 and the insulating layer 129 (these films are stacked in this order on the transparent substrate 123). A transparent conductive film 130, a liquid crystal layer 131 containing a cyan dye, and a transparent conductive film 132 are interposed between the insulating layers 129 and 133 (these films are stacked in this order on the insulating layer 129). A transparent conductive film 134, a liquid crystal layer 135 containing a magenta dye, and a transparent conductive film 136 are interposed between the insulating layers 133 and 137 (these films are stacked in this order on the insulating layer 133). A transparent conductive film 138, a liquid crystal layer 139 containing a yellow dye, and a transparent conductive film 140 are interposed between the insulating layers 137 and the substrate 124 (these films are stacked in this order on the insulating layer 137).

The liquid crystal layers 131, 135 and 139 are made of the liquid crystal for a White-Taylor type guest host mode. In the liquid crystal layer 131, since the liquid crystal molecules and the cyan dye molecules are oriented being twisted in a direction parallel to the transparent substrates 123 and 124 when no voltage is applied, the molecules selectively absorb the light having a red wavelength. When a voltage is applied, the liquid crystal molecules and the cyan dye molecules rise towards the transparent substrates 123 and 124, thereby transmitting the light at all the wavelengths. Accordingly, the transmittance of the light having a red wavelength may be controlled by applying a/no voltage. In the same way, the guest host liquid crystal layer 135 may control the transmittance of the light having a green wavelength, and the guest host liquid crystal layer 139 may control the transmittance of the light having a blue wavelength. Consequently, by stacking these three liquid crystal layers 131, 135 and 139, a full color display may be performed.

The color filter layer 125 has a plurality of filters respectively corresponding to the three primary colors of red (R), green (G) and blue (B) in stripe-shaped or a mosaic-shaped configuration.

The reflector/conductive film 128 is in an island shape or a mosaic shape, and connected to the transparent conductive films 130, 134 and 138 via through holes 142, 143 and 144, respectively.

The transparent conductive films 132, 136 and 140 are externally connected to each other, so that these three films have an equal potential. An AC voltage 141 is applied to the portion between the transparent conductive film 126 and 140. By using the above-described structure, a voltage is applied in parallel to the respective portions between the transparent conductive films 130, 136 and 140 and the transparent conductive film 126.

As described above, this example is characterized by the fact that the screen 120 has a multi-layered structure including a plurality of layers to which a voltage may be applied in parallel.

The fundamental operational principles of the screen 120 having such a structure are the same as those described in the third example. In this example, the write light is incident being divided into the three areas having the three primary colors of R, G and B. The read light is not divided into these areas, but performs a full color display by using a subtractive color mixture of cyan, magenta and yellow. Consequently, the display may be performed in a very high brightness.

In this example, an exemplary display mode using a guest host liquid crystal by a subtractive color mixture method has been described. However, the display may also be performed by using a liquid crystal layer in which the light having a particular wavelength is reflected by using a multiple interference effect caused by multi-layered films including polymer and liquid crystal so as to vary the reflectance by applying a voltage (dielectric multilayer mirror with liquid crystal), or by using a device in which a reflectance of a particular color may be varied by a selective reflection caused by a chiral pitch of a cholesteric liquid crystal.

EXAMPLE 6

In this sixth example, another possible structure and the operational principles thereof of a high-brightness screen of a similar type to that of the fifth example having a multi-layered structure allowing for a multi-color display on a pixel basis will be described below.

Figure 12:
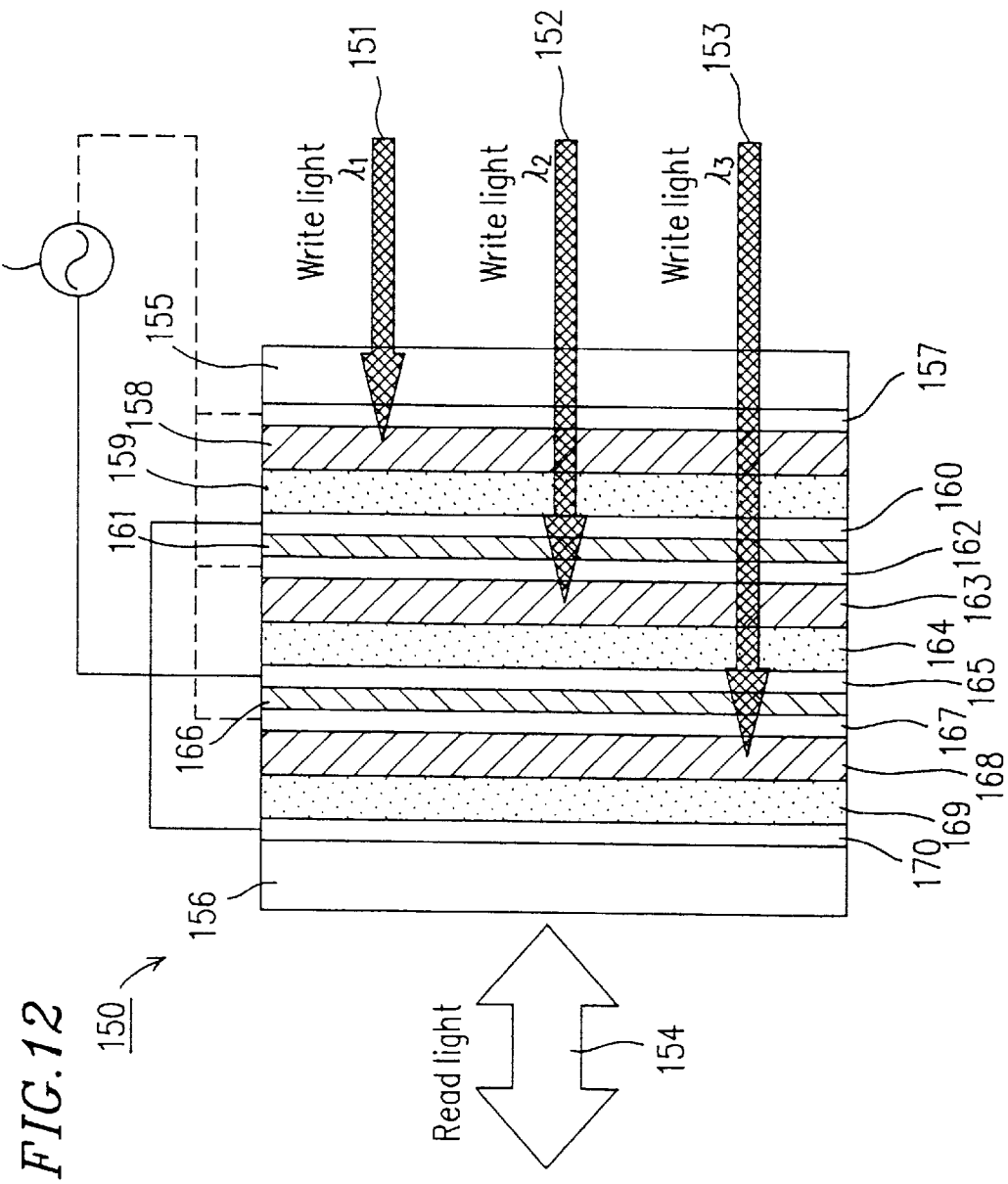
FIG. 12 is a cross-sectional view showing a fundamental structure for a screen of an image display apparatus according to a sixth example of the invention.

FIG. 12 is a cross-sectional view showing a display device having a multi-layered structure. Referring to FIG. 12, the fundamental structure of the screen 150 will be described.

This screen 150 includes a pair of transparent substrates 155 and 156 disposed so as to face each other. The portion between the transparent substrates 155 and 156 is divided into three layers by two insulating layers 161 and 166.

A transparent conductive film 157, a photoconductive film 158, a dielectric multilayer mirror with liquid crystal 159 for red display and a transparent conductive film 160 are interposed between the transparent substrate 155 and the insulating layer 161 (these films are stacked in this order on the transparent substrate 155). A transparent conductive film 162, a photoconductive film 163, a dielectric multilayer mirror with liquid crystal 164 for green display and a transparent conductive film 165 are interposed between the insulating layers 161 and 166 (these films are stacked in this order on the insulating layer 161). A transparent conductive film 167, a photoconductive film 168, a dielectric multilayer mirror with liquid crystal 169 for blue display and a transparent conductive film 170 are interposed between the insulating layers 166 and the transparent substrate 156 (these films are stacked in this order on the insulating layer 166).

In this example, the photoconductive film 158 is made of a material such as a-Si: H having an optical bandgap corresponding to the wavelength $\lambda 1$ of 0.8 $\mu$m; the photoconductive film 163 is made of a material such as a-Si$_x$Ge$_{1-x}$: H having an optical bandgap corresponding to the wavelength $\lambda 2$ of 1.3 $\mu$m; and the photoconductive film 168 is made of a material such as a-Ge: H having an optical bandgap corresponding to the wavelength $\lambda 3$ of 1.5 $\mu$m.

As described above, the respective photoconductive films 158, 163 and 168 exhibit independent sensitivities at the respective wavelengths $\lambda 1$, $\lambda 2$ and $\lambda 3$. Therefore, these films may be independently driven by using the lasers having the wavelengths $\lambda 1$, $\lambda 2$ and $\lambda 3$.

The dielectric multilayer mirrors with liquid crystal 159, 164 and 169 are formed by irradiating a laser beam from two directions onto the mixture containing a liquid crystal (5CB: extraordinary refractive index n$_e$=1.7; ordinary refractive index n$_o$=1.5) and a photocurable polymer resin (Lightlack LA0208: refractive index n=1.5); polymerizing a monomer by a two-beam interface; and forming a multi-layered film containing a liquid crystal and a polymer.

In the dielectric multilayer mirror with liquid crystal 159, since the liquid crystal molecules are aligned in parallel to the transparent substrates 155 and 156 when no voltage is applied, the average refractive index n sensed by a read light without any deflection is expressed by the following equation (2).

$$n = \sqrt{\frac{n_o^2 + n_e^2}{2}} \approx 1.6 \qquad (2)$$

Accordingly, a difference is generated between the refractive index of the liquid crystal film and that of the polymer film. In the case where multiple films having respectively different refractive indexes are stacked, the light having a wavelength ($\lambda$=4×n·d) corresponding to the optical distance of the layer is selectively reflected. The thickness of the liquid crystal film and the polymer film is set to be 100 nm, and n·d is set to be 160 nm. Therefore, a light having a wavelength of 640 nm is selectively reflected.

On the other hand, when a voltage is applied, the liquid crystal molecules rise towards the transparent substrates 155 and 156. As a result, the refractive index n$_o$ sensed by the read light without any deflection becomes 1.5 and the difference between the refractive index of the liquid crystal film and that of the polymer film no longer exists, so that the light at any wavelength is not reflected.

In the same way, in the dielectric multilayer mirror with liquid crystal 164, nod in the liquid crystal film and the polymer film is 135 nm and the light having a wavelength of 540 nm is selectively reflected. In the dielectric multilayer mirror with liquid crystal 169, n·d in the liquid crystal film and the polymer film is 100 nm and the light having a wavelength of 400 nm is selectively reflected.

The three transparent conductive films 157, 162 and 167, and the three transparent conductive films 160, 165 and 170 are externally connected to one another, so that the potential is the same among the respective sets of films. An AC current is applied to the portion between the transparent conductive films 170 and 157. By using the above-described structure, a voltage is applied in parallel to the respective portions between the transparent conductive films 157 and 160; between the transparent conductive films 162 and 165; and between the transparent conductive films 167 and 170.

As described above, the screen 150 of this example is characterized by including multiple layers being stacked to which a voltage may be applied in parallel and photoconductive films exhibiting independent sensitivities at different wavelengths to be provided for the respective layers.

The fundamental operational principles of the screen 150 having the above-mentioned structure are the same as those described in the fourth example. In this example, independent write lights 151, 152 and 153 having respectively different wavelengths $\lambda 1$, $\lambda 2$ and $\lambda 3$ are incident so as to correspond to the sensitivities of the photoconductive films, thereby independently controlling the liquid crystal in the respective layers. The read light 154 performs a full color display using the multi-layered structure composed of the red, green and blue dielectric multilayer mirrors with liquid crystal on a pixel basis by an additive color mixture method, without being divided into a plurality of areas. Consequently, a display may be performed in a very high brightness.

In this example, an exemplary display mode using dielectric multilayer mirrors with liquid crystal by an additive color mixture method has been described. Alternatively, a guest host liquid crystal device or a device in which the reflectance of a particular color may be varied by a selective reflection caused by the chiral pitch of a cholesteric liquid crystal may also be used.

EXAMPLE 7

In this seventh example, another possible structure and the operational principles thereof of a high-brightness screen of a similar type to those of the fifth and sixth examples having a multi-layered structure allowing for a multi-color display on a pixel basis will be described below.

Figure 13:
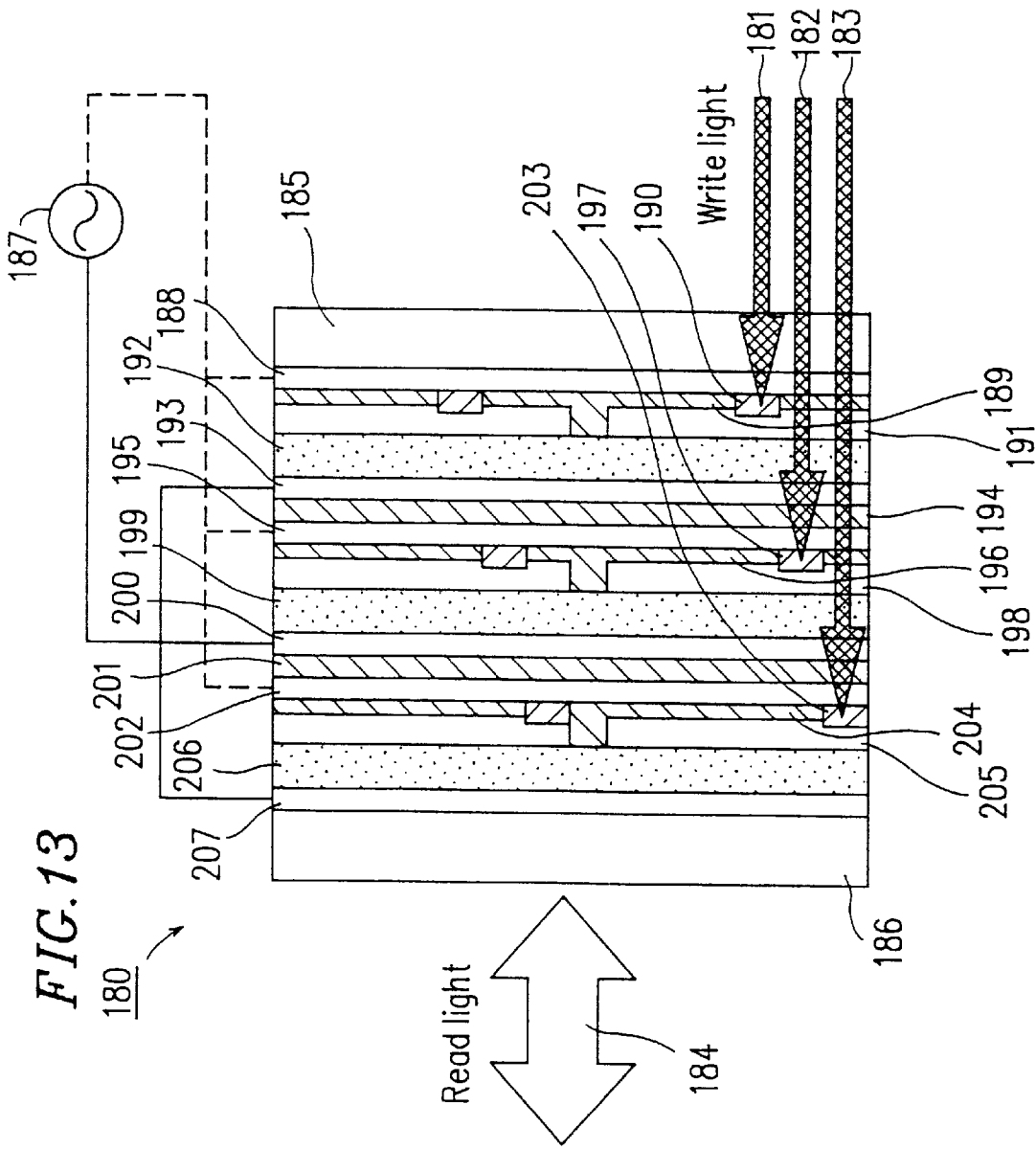
FIG. 13 is a cross-sectional view showing a fundamental structure for a screen of an image display apparatus according to a seventh example of the invention.
Figure 14:
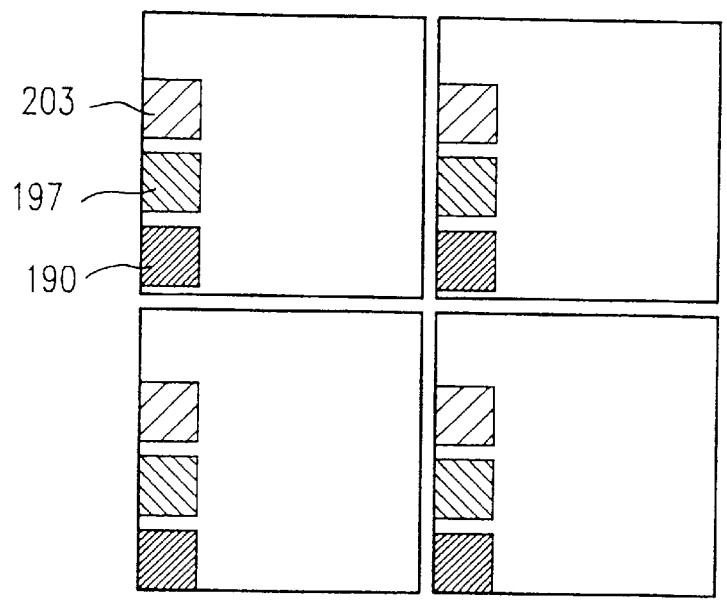
FIG. 14 is a front view showing a fundamental structure of the screen for the image display apparatus according to the seventh example of the invention.
Figure 15:
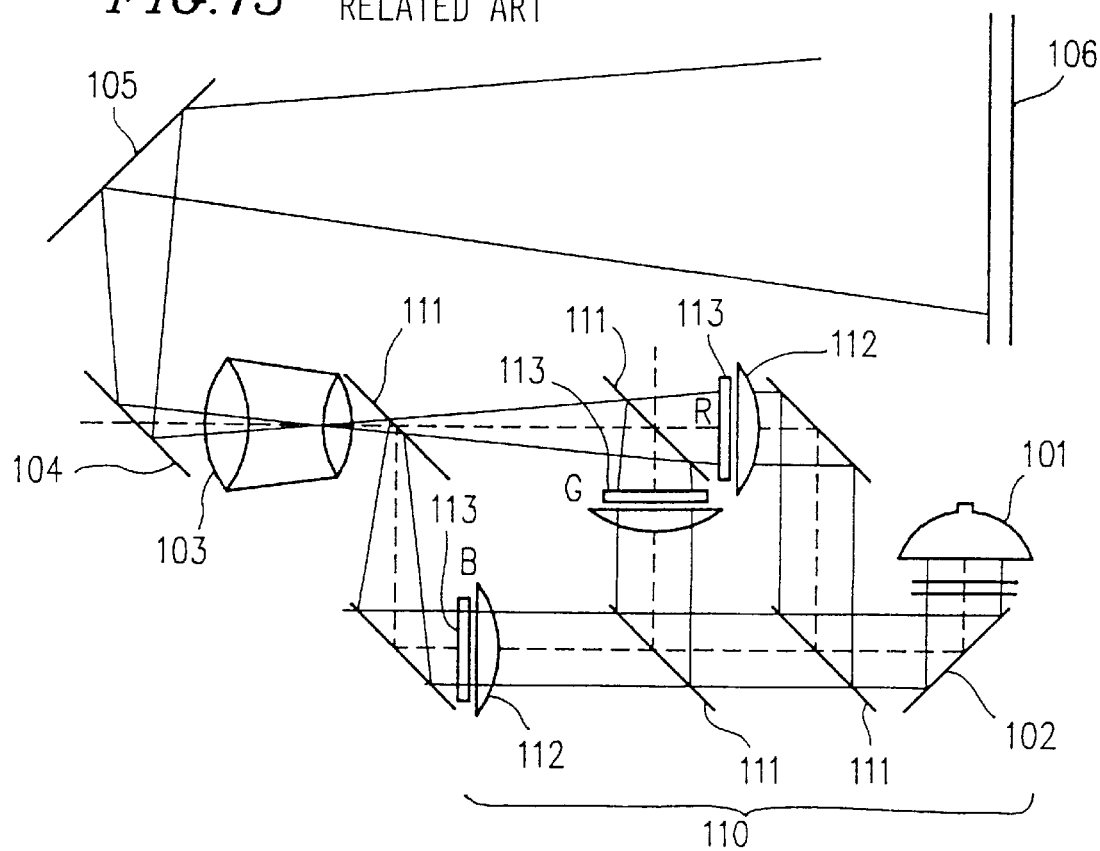
FIG. 15 is a schematic diagram showing an optical system for a conventional rear projection type image display apparatus using a liquid crystal panel.

FIG. 13 is a cross-sectional view of a display device having a multi-layered structure; and FIG. 14 is a front view thereof. Referring to FIGS. 13 and 14, the fundamental structure of the screen 180 will be described below.

This screen 180 includes a pair of transparent substrates 185 and 186 disposed so as to face each other. The portion between the transparent substrates 185 and 186 is divided into three layers by two insulating layers 194 and 201.

A transparent conductive film 188, an insulating layer 189, a photoconductive film 190, a transparent conductive film 191, a red reflective cholesteric liquid crystal layer 192 (cholesteric pitch×average refractive index (P·n) is about 650 nm) and a transparent conductive film 193 are interposed between the transparent substrate 185 and the insulating layer 194 (these films are stacked in this order on the transparent substrate 185). The liquid crystal layer 192 is made of a cholesteric liquid crystal where the liquid crystal molecules are oriented being twisted in a direction parallel to the transparent substrates 185 and 186 when no voltage is applied. The light having a wavelength of 650 nm of the read light is reflected by the liquid crystal layer 192 in accordance with cholesteric pitch x average refractive index. On the other hand, when a voltage is applied, the liquid crystal molecules rise towards the transparent substrates 185 and 186, so that the molecules are oriented in a nematic state, thereby transmitting the light at any wavelength.

A transparent conductive film 195, an insulating layer 196, a photoconductive film 197, a transparent conductive film 198, a green reflective cholesteric liquid crystal layer 199 (cholesteric pitch×average refractive index (P·n) is about 550 nm) and a transparent conductive film 200 are interposed between the insulating layer 194 and the insulating layer 201 (these films are stacked in this order on the insulating layer 194).

A transparent conductive film 202, an insulating layer 204, a photoconductive film 203, a transparent conductive film 205, a blue reflective cholesteric liquid crystal layer 206 (cholesteric pitch×average refractive index (P·n) is about 440 nm) and a transparent conductive film 207 are interposed between the insulating layer 201 and the transparent substrate 186 (these films are stacked in this order on the insulating layer 201).

The respective photoconductive films 190, 197 and 203 are made of a material such as a-$Si_xGe_{1-x}$: H having an optical bandgap corresponding to the wavelength $\lambda$ of 1.3 $\mu$m. In this case, the transparent conductive films 188, 195 and 202, and the transparent conductive films 193, 200 and 207 are externally connected to each other, so that the potential among these sets of films is equal. An AC voltage 187 is applied to the portion between the transparent conductive films 188 and 207.

The transparent electrode layers 191, 198 and 205 are patterned in a shape corresponding to one pixel (in this example, a square shape having a size of 200 $\mu$m×200 $\mu$m) as shown in FIG. 14. The respective sizes of the photoconductive films 190, 197 and 203 are set to be much smaller than the size of one pixel. In this example, the size of the photoconductive films 190, 197 and 203 are set to be 50 $\mu$m×50 $\mu$m.

By using the above-mentioned configuration, the respective photoconductive films are independently driven by the incident lights 181, 182 and 183.

As described above, the screen 180 of this example is characterized by including multiple layers to which a voltage may be applied in parallel; providing patterned transparent conductive layers for the respective layers; and setting the size of each layer to be much smaller than that of one pixel.

The fundamental operational principles of the screen 180 having the above-described structure are the same as those of the fourth and the fifth examples. In this example, the write lights 181, 182 and 183 are incident so as to correspond to the positions of the photoconductive films, thereby independently controlling the liquid crystal in the respective layers. The read light 184 performs a full color display using the multi-layered structure including cholesteric liquid crystal layers reflecting the red, green and blue colors on a pixel basis by an additive color mixture method, without being divided into a plurality of areas. Consequently, a display may be performed in a very high brightness.

In this example, an exemplary display mode performed by a device allowing for varying the reflectance of a particular color by a selective reflection caused by a chiral pitch of the cholesteric liquid crystal has been described. Alternatively, the display mode may also be performed by an additive color mixture method using a guest host liquid crystal device or a dielectric multilayer mirror with liquid crystal.

As is apparent from the foregoing detailed description, the image display apparatus of the invention may form a satisfactory image on the screen not by a high-brightness CRT or liquid crystal panel but by a low-brightness one, so that the power consumption may be reduced.

In addition, unlike an image display using light transmitted through a screen, the display apparatus of the invention performs an image display by utilizing the reflection of the surrounding light (such as a fluorescent light and natural light), so that the display quality may be improved. As a result, according to the invention, it is possible to obtain a brighter image more suitable for being displayed on an HDTV as compared with the image obtained by a conventional display apparatus. The contrast is not reduced even if the display apparatus is placed in a very bright environment or if an illuminated light is externally incident on the display screen. Consequently, it is possible to obtain a displayed image having an appropriate brightness corresponding to the environment.

Moreover, according to an image processing apparatus of the invention, a display with a very high brightness may be realized not by dividing a light into a plurality of areas, but by displaying at full colors on a pixel basis by using a plurality of liquid crystal panels for controlling the brightness of the light at particular wavelengths.

According to the invention, since the above-mentioned various effects may be obtained, it is possible to provide a novel rear projection type image display apparatus allowing for solving the problems of a conventional display apparatus.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. An image display apparatus comprising:
    a projection optical system including at least one image forming device for forming a color image and an image enlarging optical system for enlarging the color image formed by the at least one image forming device; and
    a screen including first and second faces opposed to each other, with a photoconductive layer and an optical modulation layer situated between said first and second faces for modulating an intensity of environmental light incident onto the optical modulating layer from the first face based on a variance in impedance of said photoconductive layer,
    wherein the image displayed on said screen is displayed in a reflective type direct viewing liquid crystal display mode,
    wherein said impedance is varied in accordance with an intensity of incident light emitted from said projection optical system onto said second face, and
    wherein contrast of an image displayed on the image display apparatus does not deteriorate even if there is an increase in environmental brightness.

2. The image display apparatus according to claim 1, wherein the at least one image forming device forms the color image by juxtapositional color mixing of three primary color images.

3. The image display apparatus according to claim 2, wherein the screen having three color filter layers of three primary colors in the first face side of the optical modulating layer, and the three color filters are arranged in a positional correspondence with the three primary color images.

4. The image display apparatus according to claim 2, wherein the at least one image forming device is either a color liquid crystal panel or a color cathode ray tube.

5. The image display apparatus according to claim 1, wherein the at least one image forming device forms the color image by superposing three primary color images.

6. The image display apparatus according to claim 5, wherein the screen having first and second sets of three color filter layers of three primary colors respectively in the first and second face sides of the optical modulating layer, and the first and second sets of three primary colors are arranged in a positional correspondence with each other.

7. The image display apparatus according to claim 5, wherein the at least one image forming device includes either a set of three primary color liquid crystal panels or a set of three primary color cathode ray tubes.

8. The image display apparatus according to claim 1, wherein the optical modulation layer is a liquid crystal layer sandwiched between first and second substrates respectively provided on the first face side and on the second face side, and the screen further comprises:
    a reflection layer provided between the second substrate and the liquid crystal layer;
    a photoconductive film provided between the second substrate and the reflection layer, wherein an impedance distribution is varied in accordance with a light intensity distribution of the enlarged color image;
    a pair of electrodes for applying a voltage across the photoconductive film and the liquid crystal layer.

9. An image display apparatus comprising:
    a projection optical system including a laser device for emitting an incident laser beam and a beam scanning system for sequentially scanning the laser beam to provide image information; and
    a screen including first and second faces opposed to each other, a light modulating layer and an optical modulation layer situated between said first and second faces for modulating an intensity of environmental light incident onto said optical modulating layer from said first face in accordance with said image information provided on said second face by said projection optical system,
    wherein the image displayed on said screen is displayed in a reflective type direct viewing liquid crystal display mode,
    wherein said modulated environmental light is dependent on a variance in temperature of said light modulating layer which is based on the intensity of said incident laser beam, and
    wherein contrast of an image displayed on the image display apparatus does not deteriorate even if there is an increase in environmental brightness.

10. The image display apparatus according to claim 9, wherein the screen has three color filter layers of three primary colors in the first face side of the optical modulating layer, the three color filters are arranged in a plurality of strips, and the laser beam is scanned in parallel to the plurality of strips.

11. The image display apparatus according to claim 9, wherein the optical modulation layer is a liquid crystal layer sandwiched between the first and second substrates respectively provided on the first face side and on the second face side and the screen further comprises:
    a reflection layer provided between the second substrate and the liquid crystal layer;
    a light absorption film provided between the reflection layer and the second substrate, wherein a temperature distribution is formed in accordance with the image information provided on the second substrate; and
    a pair of electrodes for applying a voltage across the liquid crystal layer and the light absorption film.

12. The image display apparatus according to claim 11, wherein the liquid crystal layer included in the screen has a function either of scattering or reflecting of the environmental light.

13. A method for color displaying an image comprising the steps of:

forming at least one color image;

enlarging the color image;

projecting the enlarged color image on a screen;

modulating an intensity of environmental light incident onto the screen from a first face of the screen in accordance with an intensity of incident light used for forming and enlarging said color image projected onto a second face of said screen, thereby performing the color display, and increasing brightness of said environmental light so as to improve contrast of the color display, wherein the image projected on said screen is displayed in a reflective type direct viewing liquid crystal display mode, and wherein contrast of the color display does not deteriorate even if there is an increase in environmental brightness.

14. The method for color displaying an image according to claim 13, wherein the at least one color image is formed by juxtapositional color mixing of three primary color images.

15. The method for color displaying an image according to claim 13, wherein the at least one color image is formed by superposing three primary color images.

16. A method for displaying an image comprising the steps of:

emitting an incident laser beam;

scanning said incident laser beam to provide image information to a screen; and modulating an intensity of environmental light incident onto the screen from a first face of the screen in accordance with the image information provided from said scanned incident laser beam on a second face of the screen, thereby performing the display, wherein said step of modulating is further dependent on a variance in temperature of a light modulating layer situated between said first and second faces; said temperature varied in accordance with the intensity of said incident laser beam, wherein the image displayed on said screen is displayed in a reflective type direct viewing liquid crystal display mode, and wherein contrast of the displayed image on the screen does not deteriorate even if there is an increase in environmental brightness.

17. The image display apparatus according to claim 9, wherein an increase in environmental brightness increases a contrast ratio of the color display.

* * * * *